(12) United States Patent
Albert et al.

(10) Patent No.: US 11,928,978 B2
(45) Date of Patent: Mar. 12, 2024

(54) AIRPORT MAPPING DATABASE USING A NODE-EDGE NETWORK OF GEOSPATIAL OBJECTS

(71) Applicant: THE BOEING COMPANY, Chicago, IL (US)

(72) Inventors: Klaus-Dieter Albert, Hessen (DE); David Fundter, Baden-Wuerttemberg (DE)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/805,170

(22) Filed: Jun. 2, 2022

(65) Prior Publication Data

US 2023/0394984 A1  Dec. 7, 2023

(51) Int. Cl.
*G08G 5/06* (2006.01)
*G06F 16/29* (2019.01)
*G08G 5/00* (2006.01)

(52) U.S. Cl.
CPC ............ *G08G 5/065* (2013.01); *G06F 16/29* (2019.01); *G08G 5/0026* (2013.01); *G08G 5/06* (2013.01)

(58) Field of Classification Search
CPC ...... G08G 5/00; G08G 5/0013; G08G 5/0021; G08G 5/065; G01C 21/00; G01C 21/28; G01C 21/34; G01C 21/3626; G01C 21/3667; G06F 17/30; G06F 19/00
See application file for complete search history.

(56) References Cited

U.S. PATENT DOCUMENTS

| | | | | |
|---|---|---|---|---|
| 8,296,060 | B2 * | 10/2012 | Fetzmann | G08G 5/0013 701/413 |
| 2004/0006412 | A1 * | 1/2004 | Doose | G01C 21/26 701/122 |
| 2008/0313129 | A1 * | 12/2008 | Pschierer | G08G 5/065 |
| 2009/0150068 | A1 * | 6/2009 | Villaume | G05D 1/0083 701/467 |
| 2016/0171899 | A1 * | 6/2016 | Depare | G08G 5/0021 701/428 |

OTHER PUBLICATIONS

NPL Search (Jun. 26, 2023).*
Flightaware, "FlightAware Announces New Taxi-Out Duration Prediction Increasing Operational Accuracy," May 12, 2022, https://blog.flightaware.com/taxioutpredictions?utm_content=208251919&utm_medium=social&utm_source=linkedin&hss_channel=lcp-232470.

* cited by examiner

*Primary Examiner* — Van T Trieu
(74) *Attorney, Agent, or Firm* — Moore IP Law

(57) ABSTRACT

A method includes receiving geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The method also includes determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. The method also includes generating spatial relationship data describing the routing relationship, wherein generating the spatial relationship data comprises generating data describing nodes or edges of a node-edge network.

20 Claims, 12 Drawing Sheets

AIRPORT MAPPING DATABASE USING A NODE-EDGE NETWORK OF GEOSPATIAL OBJECTS

FIELD OF THE DISCLOSURE

The subject disclosure is generally related to improving an airport mapping database using a node-edge network of geospatial objects.

BACKGROUND

As air travel continues to grow and expand, the safety and efficiency of aircraft taxiing becomes more important. Certain systems for routing taxiing aircraft include an airport mapping database ("AMDB"), which can include data related to a variety of surface features of an airport, including taxiways, parking stands, etc. However, these systems remain inefficient and error-prone, requiring flight crew to manually plot routes among the various surface features due to limitations and inefficiencies of current airport mapping databases such as a lack of data describing relationships between or among various surface features.

Other particular systems can make use of an airport routing surface network ("ARSN"), which can include certain elements of a node-edge network relating surface elements used by taxiing aircraft (e.g., taxiway, runway, displaced area, etc.). However, the ARSN system can be difficult and expensive to maintain and update due to the complex nature of the network and the variety and volume of surface elements.

SUMMARY

In a particular implementation, a method includes receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The method also includes determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. The method also includes generating spatial relationship data describing the routing relationship, wherein the spatial relationship data is descriptive of a node-edge network, and adding the spatial relationship data to the geospatial data.

In another particular implementation, a method includes receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The method also includes determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. The method also includes generating spatial relationship data describing the routing relationship, wherein generating the spatial relationship data comprises generating data describing nodes or edges of a node-edge network. The method also includes adding the spatial relationship data to the geospatial data.

In another particular implementation, a system includes a memory configured to store instructions and one or more processors configured to receive, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The one or more processors are also configured to determine a routing relationship between the first geospatial object and the second geospatial objects based at least on the first geospatial data and the second geospatial data, wherein the routing relationship indicates that an aircraft using the airport taxi system can pass from the first geospatial object to the second geospatial object. The one or more processors are also configured to generate spatial relationship data describing the routing relationship, wherein generating the spatial relationship data comprises generating data describing nodes or edges of a node-edge network. The one or more processors are also configured to add the spatial relationship data to the geospatial data.

In another particular embodiment, a non-transient, computer-readable medium stores instructions that, when executed by one or more processors, cause the one or more processors to initiate, perform, or control operations including receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The operation also includes determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. The operation also includes generating spatial relationship data describing the routing relationship, wherein generating the spatial relationship data comprises generating data describing nodes or edges of a node-edge network. The operation also includes adding the spatial relationship data to the geospatial data.

The features, functions, and advantages described herein can be achieved independently in various implementations or can be combined in yet other implementations, further details of which can be found with reference to the following description and drawings.

DETAILED DESCRIPTION

Aspects disclosed herein improve an airport mapping database ("AMDB") using a node-edge network of geo spatial objects. Rather than create a network from scratch, tying together all airport surface features, the aspects disclosed herein leverage existing AMDB data to create a node-edge network, enabling automated routing of taxiing aircraft. Additionally, the aspects disclosed herein improve the process of creating a node-edge network by automating the network generation itself from AMDB data. In some aspects, the systems and methods including generating new spatial relationship data describing a relationship between or among a plurality of surface elements, as described in the AMDB, and storing the spatial relationship data in the AMDB for use by other software in providing automated routing for taxiing aircraft.

The systems and methods disclosed herein create a set of topologically related elements from various geometries (polygons and lines) representing different surface entities which are not necessarily topologically related. For example, certain characteristics of various polygons representing a taxiway surface can be used to identify taxiway intersections and neighbors. Surface edges can be used to define the topology. In addition, rules can be implemented defining how surface objects that can be used for taxiing, but aren't topologically related, can be related to the initial topology. For example, these rules can include segmentation of runway polygons and runway-displaced areas to bridge topological gaps between taxiways, rules connecting parking stands, and including position markings, stopbars, etc. as potential origin and/or destination elements of a taxi route. Once topological relationships among the various surface elements are established, an algorithm utilizing the specific characteristics of this topology can allow for identification of surface elements for further use in automated routing.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
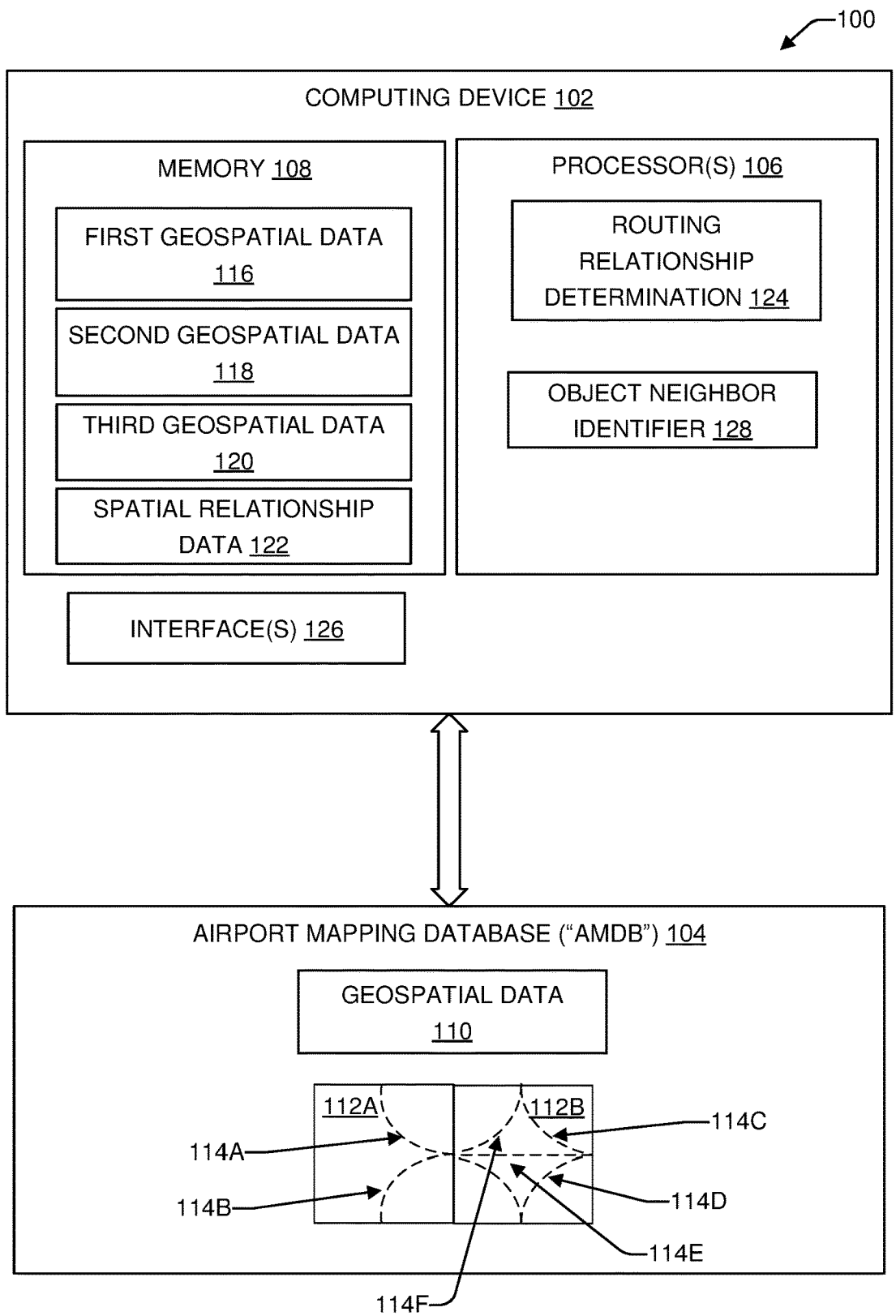
FIG. 1 depicts an example system for improving an airport mapping database using a node-edge network of geospatial objects, in accordance with at least one implementation of the subject disclosure.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 106 in FIG. 1), which indicates that in some implementations the system 100 includes a single processor 106 and in other implementations the system 100 includes multiple processors 106. For ease of reference herein, such features are generally introduced as "one or more" features and are subsequently referred to in the singular unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple geospatial objects are illustrated and associated with reference numbers 112A and 112B. When referring to a particular one of these geospatial objects, such as the first geospatial object 112A, the distinguishing letter "A" is used. However, when referring to any arbitrary one of these geospatial objects or to these geospatial objects as a group, the reference number 112 is used without a distinguishing letter.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for improving an airport mapping database using a node-edge network of geospatial objects, in accordance with at least one implementation of the subject disclosure. In some implementations, the system 100 includes one or more computing devices 102 configured to communicate with an airport mapping database ("AMDB") 104.

The AMDB 104 can be configured to store geospatial data 110. The geospatial data 110 is representative of a plurality of geospatial objects of an airport taxi system. For the purposes of the subject disclosure, a "geospatial object" can include any portion of an airport taxi system. Such portions of the airport taxi system include, for example, fixtures, markings, structures, and lands that together form the airport taxi system. As illustrative examples, the geospatial objects can include all or a portion of: a runway, a parking stand, deicing location, taxi guidance object (e.g., a taxi guidance line), taxiway intersection, taxiway object (e.g., a portion of a taxiway), taxi holding area, stopway, runway displaced area, a neighbor of one or more other geospatial objects, or some combination thereof.

In some implementations, the geospatial data 110 can include one or more data fields describing one or more geospatial objects. As an illustrative example, FIG. 1 illustrates two exemplary geospatial objects 112A, 112B. The AMDB 104 can include first geospatial data representative of a first geospatial object 112A and second geospatial data representative of a second geospatial object 112B. In the illustrative example, geospatial objects 112A, 112B are portions of a taxiway in an airport taxi system. The first geospatial object 112A includes two illustrative taxi guidance lines 114A, 114B. The second geospatial object 112B includes four illustrative taxi guidance lines 114C, 114D, 114E, 114F.

In some implementations, the taxi guidance lines 114A, 114B, 114C, 114D, 114E, 114F can be, for example, lines physically present on a taxiway to aid pilots in maneuvering an aircraft through the taxiway. In other implementations, the taxi guidance lines 114A, 114B, 114C, 114D, 114E, 114F can be virtual objects, described by their respective associated data and visible to crew only through software.

In an airport runway system, routing relationships between the plurality of geospatial objects can exist. For the purposes of the subject disclosure, a "routing relationship" can include a topological relationship between or among one or more geospatial objects, where the topological relationship indicates a portion of one or more potential travel routes for an airplane through a portion of an airport runway system. For example, first and second geospatial objects 112A, 112B can be physically adjacent. In such an example, the taxi guidance lines associated with each geospatial object can also be interconnected. To illustrate, the taxi guidance line 114E can form a taxiing route with either taxi guidance line 114A or taxi guidance line 114B. As another illustrations, the taxi guidance line 114F can form a taxiing route with either taxi guidance line 114A or taxi guidance line 114B. By contrast, certain geospatial objects do not have a routing relationship. For example, taxi guidance lines may not connect the geospatial objects, another structure (e.g., terminal, parking stand, etc.) or other obstacle (e.g. water, non-airport property, etc.), may lie on a route connecting the geospatial objects.

In certain configurations of the AMDB 104, however, the routing relationships between or among geospatial objects (e.g., the neighbor relationship of first and second geospatial objects 112A, 112B) are not reflected in the geospatial data 110. For example, Table 1 below illustrates an entry in the AMDB 104 associated with the exemplary geospatial objects 112A, 112B. The data Table 1 illustrates the airport runway system to which the exemplary geospatial objects 112A, 112B belong ("KSEA," associated with the Seattle-Tacoma International Airport), an identifier associated with the geospatial objects (e.g., "W" for the second geospatial object 112B and "B" for the first geospatial object 112A), and an indicator of whether the geospatial object is parallel to other geospatial objects (e.g., "0," where 0 indicates no and 1 indicates yes).

TABLE 1

| Airport Identifier | Identifier | Parallel |
|---|---|---|
| KSEA | W | 0 |
| KSEA | B | 0 |

The geospatial data associated with exemplary geospatial object 112B, as illustrated in TABLE 1, indicates that the geospatial object 112B is located at the Seattle Airport, is identified in the AMDB 104 as "W," and is not parallel to other geospatial objects. The "Parallel" identifier is described in more detail below with reference to FIGS. 2-11. The geospatial data 110 associated with the second geospatial object 112B does not include, for example, any data indicating a routing relationship with other geospatial objects (e.g., the interconnected taxiways of the first geospatial object 112A and the second geospatial object 112B). Determining the routing relationship(s) between or among the geospatial objects represented by the geospatial data 110, generating spatial relationship data describing the routing relationship(s), and adding the spatial relationship data to the geospatial data 110 is described in more detail below and with reference to FIGS. 2-12.

In some implementations, the AMDB 104 can communicate some or all of the geospatial data 110 to the computing device 102 via one or more interfaces 126. The computing device(s) 102 can include one or more processors 106 coupled to a memory 108. The processor(s) 106 can be configured to determine a routing relationship between a first geospatial object (e.g., the illustrative first geospatial object 112A) and a second geospatial object (e.g., the illustrative second geospatial object 112B) based at least on first geospatial data 116 representative of the first geospatial object and second geospatial data 118 representative of the second geospatial object. In some aspects, the processor(s) 106 can be further configured to determine a routing relationship among a first geospatial object, a second geospatial object, and a third geospatial object represented by third geospatial data 120. In a particular aspect, the first geospatial data 116, the second geospatial data 118, and the third geospatial data 120 can be stored at the memory 108 for processing by the processor(s) 106.

In some implementations, a routing relationship determination module 124 of the processor(s) 106 can be configured to determine a routing relationship between the first and second geospatial objects. Determining the routing relationship can include determining any topological relationships between or among geospatial objects. Illustrative examples include determining whether: geospatial objects are part of a contiguous taxiway portion; taxi guidance lines are common between or among geospatial objects; geospatial objects are part of a contiguous runway portion; geospatial objects are part of a stopway region; geospatial objects are part of a parking region; geospatial objects are part of a deicing region; geospatial objects are part of a taxi holding region; etc. Exemplary methods for determining each of these illustrative routing relationships are described in more detail below with reference to FIGS. 2-11.

As one example of a routing relationship, the routing relationship determination module 124 of the processor(s) 106 can be configured to determine that the exemplary first and second geospatial objects 112A, 112B of FIG. 1 share a common boundary. This common boundary can indicate that the first and second geospatial objects 112A, 112B are part of a contiguous taxiway portion. One exemplary method for determining this particular type of routing relationship is described in more detail below with reference to FIG. 4. Once the routing relationship is determined, the processor(s) 106 can also be configured to generate spatial relationship data 122 describing the routing relationship. The spatial relationship data 122, which can be stored at the memory 108, can, in some aspects, be descriptive of a node-edge network. For example, the spatial relationship data 122 can include data describing an edge connecting one or more nodes. In the illustration of FIG. 1, the spatial relationship data 122 can include data describing the common boundary between the first and second geospatial objects 112A, 112B.

Once the spatial relationship data 122 is generated, the processor(s) 106 can be further configured to add the appropriate portions of the spatial relationship data 122 to the appropriate portions of the geospatial data 110. Using the same illustrative example, spatial relationship data 122 describing the common boundary between the first and second geospatial objects 112A, 112B can be added to the first geospatial data 116 for the first geospatial object 112A and the second geospatial data 118 for the second geospatial object 112B. In a particular aspect, the spatial relationship data 122 describing this routing relationship for the second geospatial object 112B can include a field identifying the other geospatial objects that form part of the intersecting taxiway of the second geospatial object 112B (e.g., an identifier associated with the first geospatial object 112A). This field can, in some particular aspects, include a plurality of identifiers of intersecting taxiways that can, for example, be delimited by a particular character (e.g., "&"). The spatial relationship data 122 in this example can also include a field identifying the second geospatial object 112B as a node in the node-edge network with, for example, a node identification number. The spatial relationship data 122 in this example can also include a field identifying one or more neighboring geospatial objects by, for example, the node identification number(s) of the neighbor(s). Table 2 below illustrates an example of the spatial relationship data 122 generated for the exemplary second geospatial object 112B (the first column is repeated from Table 1 to aid in understanding):

TABLE 2

| Identifier | Related Geospatial Objects | Node Identification | Neighbors |
|---|---|---|---|
| W | W&B | 123 | 789 |
| B | W&B | 456 | 789 |

Exemplary methods for determining node identification numbers and neighbors are described in more detail below with reference to FIGS. 2-12. In some implementations, the object neighbor identifier 128 of the processor(s) 106 can be configured to identify one or more neighbors associated with one or more geospatial objects. With this updated data structure, the improved AMDB 104 can be used to support automated routing of an aircraft through an airport runway system.

Although FIG. 1 illustrates certain operations occurring within the computing device 102, certain operations can be performed by other components of the system 100 without departing from the scope of the subject disclosure. For example, the AMDB 104 can be configured to parse the geospatial data 110 into the first geospatial data 116, the second geospatial data 118, and the third geospatial data 120 prior to communicating that data to the computing device 102.

Further, although FIG. 1 illustrates the computing device 102 and the AMDB 104 as separate, other configurations are possible without departing from the scope of the subject disclosure. For example, the computing device 102 and the AMDB 104 can be integrated into an electronic device. As an additional example, some or all components of the computing device 102 can be integrated into the same electronic device as some or all components of the AMDB 104. As a further example, one or more components of the computing device 102 and/or one or more components of the AMDB 104 can be distributed across a plurality of computing devices (e.g., a group of servers).

Figure 2:
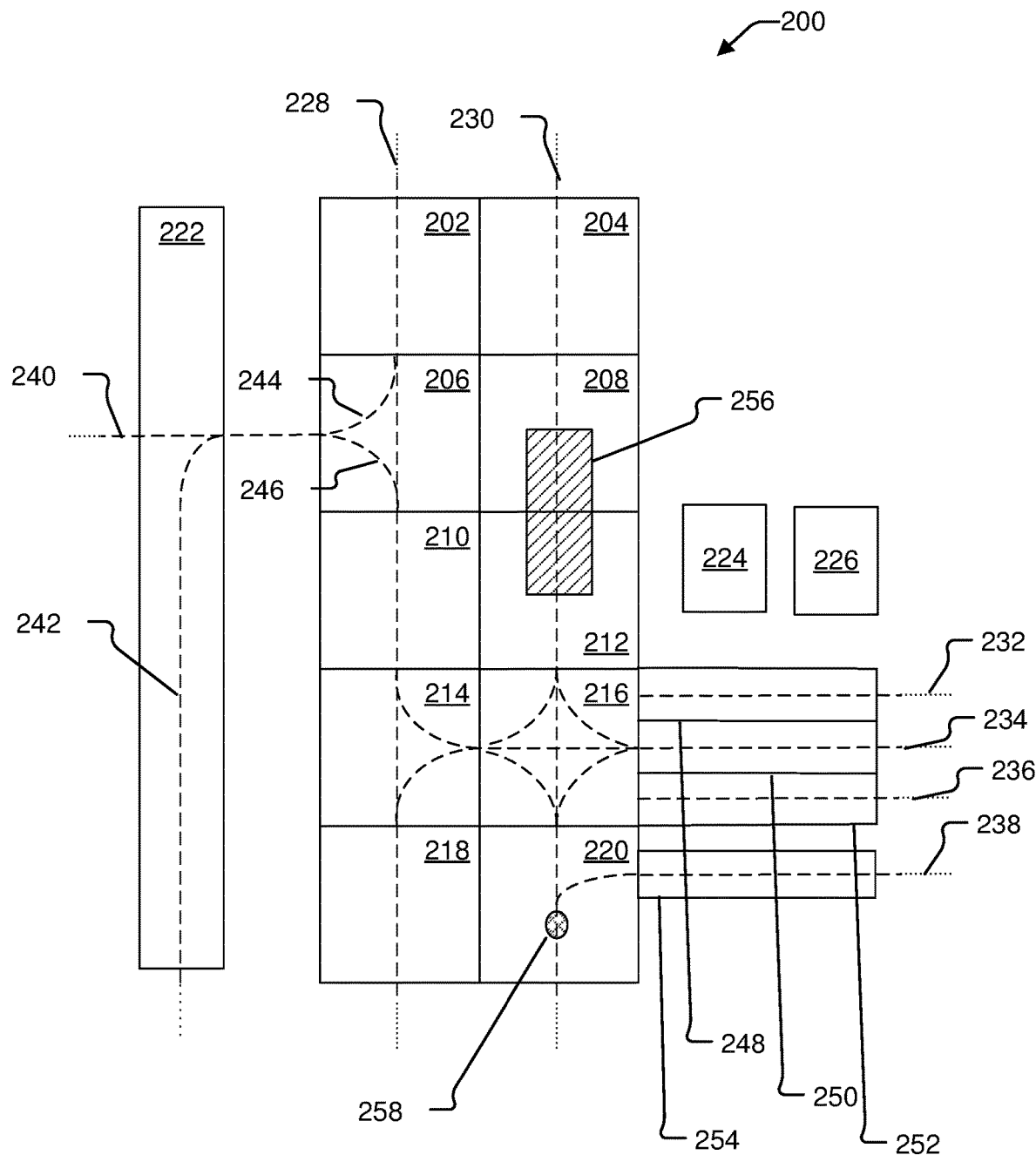
FIG. 2 depicts an example airport runway system that can be described by the geospatial data stored in the AMDB of FIG. 1, in accordance with the subject disclosure.

FIG. 2 depicts an example airport runway system 200 that can be described by the geospatial data 110 stored in the AMDB 104 of FIG. 1, in accordance with the subject disclosure. FIG. 2 illustrates an example airport runway system 200 that can be described by a plurality of geospatial objects 202, 204, 206, 208, 210, 212, 214, 216, 218, 220, 222, 224, 226, 248, 250, 252, 254. As noted above, each of these geospatial objects is associated with a portion of the airport runway system 200. For example, the geospatial object 222 forms part of a contiguous runway portion. The geospatial objects 202, 204, 206, 208, 210, 212, 214, 216, 218, 220 form part of a contiguous taxiway portion. The geospatial objects 224, 226 are parking stands that can be accessed from the runway portion via the taxiway portion. The geospatial objects 248, 250, 252, 254 are part of one or more other contiguous taxiway portions for navigating an aircraft from the larger taxiway portion to the parking stands 224, 226.

In some implementations, the system 200 can also include a plurality of features that define routing relationships between or among the various geospatial objects. As an illustrative example, the system 100 of FIG. 1 can be configured to determine that the geospatial object 222 is related to the geospatial object 206 via taxi guidance lines 240, 242, 244, 246. The system 100 can also be configured to determine that the geospatial objects 248, 250, 252 are related to one another even though the taxi guidance lines 232, 234, 236 do not intersect one another. As described in more detail below with reference to FIG. 4, the system 100 can determine that the geospatial objects 248, 250, 252 form part of a larger taxi guidance portion. For example, a single large aircraft can use taxiways formed by the geospatial objects 248, 250, 252 as a single large taxiway (e.g., by taxiing along the guidance line 234 while encroaching into taxiways associated with guidance lines 232, 236). At a different time, two smaller aircraft can taxi simultaneously along the taxiways formed by the geospatial objects 248, 250, 252 (e.g., a first aircraft can taxi along guidance the line 236 at the same time a second aircraft taxis along the guidance line 232).

Figure 4:
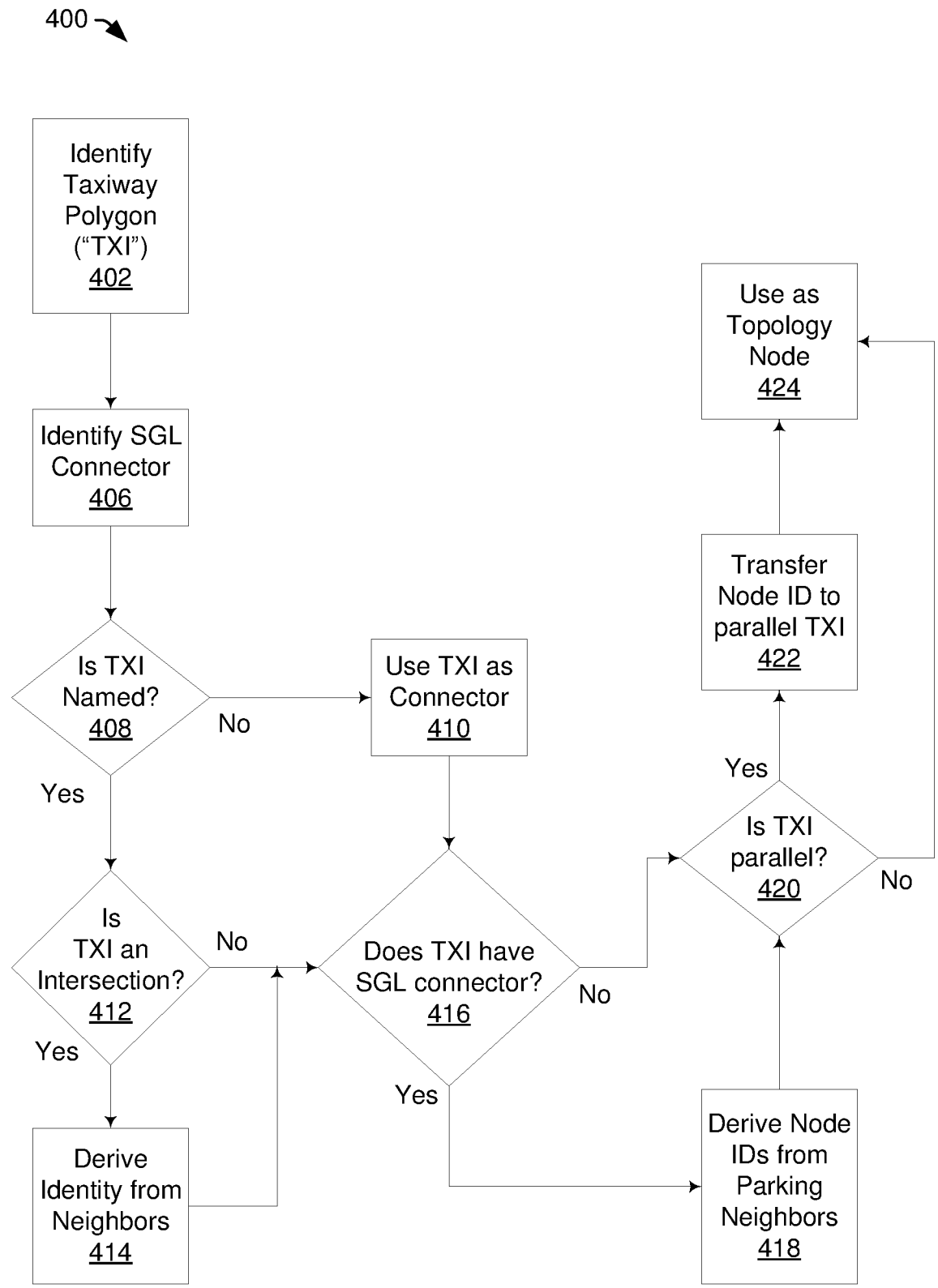
FIG. 4 is a flow chart of an example method for determining one or more topology nodes to describe a taxiway of an airport runway system, in accordance with the subject disclosure.

The system 100 can also be configured to determine that the geospatial objects 202, 206, 210, 214, 218 are related to: one another via taxi guidance line 228; the geospatial object 222 via the taxi guidance lines 240, 242, 244, 246; the geospatial objects 204, 208, 212, 216, 220 via the taxi guidance line 228, 230, 234; the geospatial objects 248, 250, 252 via the taxi guidance lines 228, 232, 234, 236; and the geospatial object 254 via the taxi guidance lines 228, 230, 238; as described in more detail below with reference to FIG. 4. The system 100 can also be configured to determine that the geospatial objects 204, 208, 212, 216, 220 are related to: one another via taxi guidance line 230; the geospatial objects 202, 206, 210, 214, 218 via the taxi guidance lines 228, 230, 234; the geospatial objects 248, 250, 252 via the taxi guidance lines 230, 232, 234, 236; and the geospatial object 254 via the taxi guidance lines 230, 238; as described in more detail below with reference to FIG. 4.

In some implementations, the system 100 can also be configured to determine that the geospatial objects 208, 212 are related to one another due to the presence of the deicing area 256, as described in more detail below with reference to FIG. 10. In the same or alternative implementations, the system 100 can also be configured to determine that the geospatial object 220 includes a holding area 258, as described in more detail below with reference to FIG. 11. In further the same or alternative implementations, the system 100 can be configured to determine that the geospatial object 254 is part of a taxi guidance object, as described in more detail below with reference to FIG. 5. In still further the same or alternative implementations, the system 100 can be configured to determine that the geospatial object 222 is part of a runway and/or runway intersection object, as described in more detail below with reference to FIG. 7.

In some aspects, the system 100 of FIG. 1 can be further configured to determine whether one or more geospatial objects represented by the geospatial data 110 include one or more taxi guidance lines, as described in more detail below with reference to FIG. 6, and/or one or more parking stand guidance lines, as described in more detail below with reference to FIG. 6. In some aspects, the system 100 can be further configured to determine whether one or more geospatial objects include a stopway region, as described in more detail below with reference to FIG. 8. In some aspects, the system 100 can be still further configured to determine whether one or more geospatial objects form part of a dedicated aircraft parking area, as described in more detail below with reference to FIG. 9.

Although FIG. 2 illustrates certain illustrative geospatial objects related in certain manners, one of ordinary skill in the art will recognize that an airport runway system can include more, fewer, and/or different geospatial objects related in myriad ways without departing from the scope of the subject disclosure.

Figure 3:
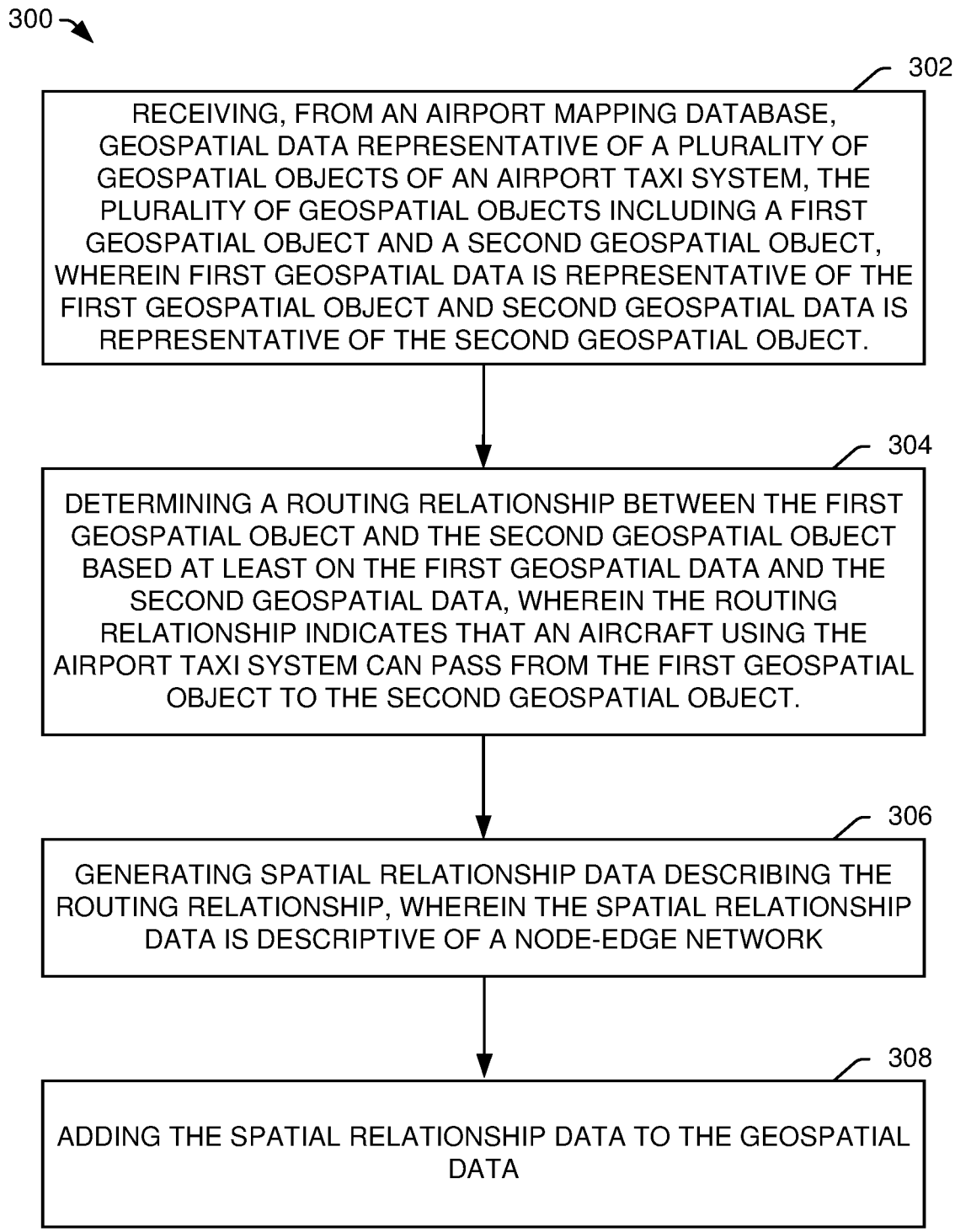
FIG. 3 is a flow chart of an example of a method for improving an airport mapping database using a node-edge network of geospatial objects, in accordance with the subject disclosure.

FIG. 3 is a flow chart of an example of a method 300 for improving an airport mapping database using a node-edge network of geospatial objects, in accordance with the subject disclosure. The method 300 can be initiated, performed, or controlled by one or more processors executing instructions, such as by the processor(s) 106 of FIG. 1 executing instructions from the memory 108.

In some implementations, the method 300 includes, at 302, receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. For example, the processor(s) 106 can receive the geospatial data 110 from the AMDB 104, the geospatial data 110 representative of a plurality of geospatial objects of an airport taxi system (e.g., the geospatial objects 112A, 112B of FIG. 1; the geospatial objects 202, 204, 206, 208, 210, 212, 214, 216 218, 220, 222, 224, 226, 248, 250, 252, 254 of FIG. 2) including a first geospatial object (e.g., the first geospatial object 112A) and a second geospatial object (e.g., the second geospatial object 112B), wherein first geospatial data (e.g., the first geospatial data 116) is representative of the first geospatial object and the second geospatial data (e.g., the second geospatial data 118) is representative of the second geospatial object.

In the example of FIG. 3, the method 300 also includes, at 304, determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. For example, the routing relationship determination module 124 of the processor(s) 106 of FIG. 1 can determine a routing relationship between the first geospatial object 112A and the second geospatial object 112B based at least on the first geospatial data 116 and the second geospatial data 118, wherein the routing relationship indicates that an aircraft using the airport taxi system can pass from the first geospatial object to the second geospatial object In the example of FIG. 3, the method 300 also includes, at 306, generating spatial relationship data describing the routing relationship, wherein the spatial relationship data is descriptive of a node-edge network. For example, the processor(s) 106 of FIG. 1 can generate the spatial relationship data 122 describing the routing relationship, wherein the spatial relationship data is descriptive of a node-edge network.

In the example of FIG. 3, the method 300 also includes, at 308, adding the spatial relationship data to the geospatial data. For example, the processor(s) 106 of FIG. 1 can add the spatial relationship data 122 to the geospatial data 110.

Although the method 300 is illustrated as including a certain number of steps, more, fewer, and/or different steps can be included in the method 300 without departing from the scope of the subject disclosure. For example, the method 300 can add the spatial relationship data to the geospatial data associated with one geospatial object before generating the spatial relationship data associated with another geospatial object. As another example, the method 300 can determine a routing relationship among a large number of geospatial objects.

FIG. 4 is a flow chart of an example method 400 for determining one or more topology nodes to describe a taxiway of an airport runway system, in accordance with the subject disclosure. For the purposes of the subject disclosure, a "topology node" includes a polygon and/or data describing a polygon, where the polygon and/or its associated data is used as a node in a node-edge network. The method 400 can be initiated, performed, or controlled by one or more processors executing instructions, such as by the processor(s) 106 of FIG. 1 executing instructions from the memory 108.

In some implementations, the method 400 includes, at 402, identifying a taxiway polygon ("TXI"). For example, the processor(s) 106 of FIG. 1 can analyze the first geospatial data 116 to identify boundaries (e.g., coordinates of corners and/or edges) of a taxiway. In a particular aspect, one or more fields of the first geospatial data 116 can include data representative of a code or identifier indicating the first geospatial object is part of a taxiway.

In the example of FIG. 4, the method 400 also includes, at 406, identifying a parking stand guidance ("SGL") connector. For example, the processor(s) 106 of FIG. 1 can identify an SGL connector, as described in more detail below with reference to FIG. 6.

In the example of FIG. 4, the method 400 also includes, at 408, determining whether the TXI is named. For example, the processor(s) 106 of FIG. 1 can determine whether a particular geospatial object is named. In a particular aspect, one or more fields of the first geospatial data 116 can include data representative of a particular "name" for a taxiway. If multiple geospatial objects include the same portion of a taxiway, for example, each geospatial object including that portion can have geospatial data that includes a name for that portion of taxiway. If the TXI is not named, the method 400 can, in the example of FIG. 4, proceed to 410, where the method 400 can use the TXI as a topology connector. In some implementations, the topology connector can be a logical data object that describes one or more polygons that can be used as nodes to describe a node-edge network.

If the TXI is named, the method 400 can, in the example of FIG. 4, proceed to 412, where the method 400 can determine whether the TXI is an intersection. In some implementations, this can include, for example, the processor(s) 106 of FIG. 1 determining whether (1) the TXI shares more than two edges with an adjacent, non-parallel TXI, or (2) the TXI shares more than one edge with an adjacent, non-parallel TXI and more than zero edges with one or more runways. As noted above with reference to FIG. 1, the geospatial data 110 associated with a particular geospatial object can include data indicating whether the particular geospatial object is parallel to another geospatial object. Using the example airport runway system 200 of FIG. 2, the geospatial objects 214, 216 may not be parallel, while the geospatial objects 248, 250, 252 may be parallel. In some aspects, the geospatial data 110 associated with a particular geospatial object can include data indicating whether a particular geospatial object is part of a runway.

Referring again to the example system 200 of FIG. 2, the geospatial object 216 can be identified as an intersection because it is named (e.g., as part of the taxiway along the taxi guidance line 230 through the geospatial objects 204, 208, 212, 216, 220), it is not parallel in this example, and it shares more than two edges with other adjacent, non-parallel TXI (e.g., the geospatial objects 212, 214, 220). As an additional example, the geospatial object 206 can be identified as an intersection because it is named (e.g., as part of the taxiway along the taxi guidance line 228 through the geospatial objects 202, 206, 210, 214, 218), it is not parallel in this example, and it shares more than one edge with other adjacent, non-parallel TXI (e.g., the geospatial objects 202, 210) and more than zero edges with a runway (e.g., the geospatial object 222).

If the TXI is an intersection, the method 400 can include, at 414, deriving an identifier from the neighbor(s) of the TXI. In some implementations, identifying the one or more neighbors of the TXI can include identifying other geospatial objects within a particular threshold distance from the TXI, applying a nearest-neighbor algorithm to some or all of the geospatial data 110, or other appropriate methods. In the same or alternative implementations, the identifier can include data indicative of an intersection identifier associated with one or more geospatial objects. As noted above with reference to FIG. 1, this can include, for example, combining the names of the intersecting taxiways with a delimiting character to generate an intersection (e.g., "W&B," as described in FIG. 1 and TABLE 1). Once the identifier is derived, the method 400 can proceed to 416, which the method 400 also includes if the TXI is not an intersection.

In some implementations, the method 400 also includes, at 416, determining whether the TXI has a stand guidance ("SGL") connector. For example, the processor(s) 106 of FIG. 1 can determine whether an SGL connector exists, as described in more detail above with reference to 406 and below with reference to FIG. 6, and whether the SGL connector is associated with the TXI.

In the example of FIG. 4, if the TXI does have an SGL connector, the method 400 includes, at 418, deriving node identifiers ("Node IDs") from parking neighbors. For example, the processor(s) 106 of FIG. 1 can examine the list of nearest neighbors (e.g., neighbors identified as described above with reference to 414) to determine if any of those neighboring geospatial objects have associated geospatial data 110 that identifies the neighbor as a parking-related geospatial object. The processor(s) 106 can be configured to generate node identifiers from the neighboring geospatial objects that have been identified as parking-related. In some aspects, the node IDs can be derived from the geospatial data 110 associated with each geospatial object. In the same or alternative aspects, the node IDs can be derived by some other appropriate means to identify a geospatial object as a parking-related neighbor to the TXI.

After deriving this node IDs, the method 400 can proceed to 420, which the method 400 also includes if the TXI does not have an associated SGL connector. At 420, the method 400 includes determining whether a TXI is parallel. As noted above with reference to 412 and FIG. 1, the geospatial data 110 associated with a TXI can include data identifying whether the TXI is considered "parallel" within a particular airport runway system.

If the TXI is parallel, the method 400 can include, at 422, transferring a node ID to the other named, taxiway-related geospatial objects that are parallel to the TXI. In some aspects, transferring the node ID can include copying a unique identifier associated with the TXI to the other named, taxiway-related geospatial objects that are parallel to the TXI. In the same or alternative aspects, transferring the node ID can include transferring the node ID derived at 418, as detailed above.

In the example of FIG. 4, once the node ID is transferred, the method 400 can proceed to 424, which the method 400 also includes if the TXI is not identified as parallel. At 424, the method 400 can include identifying the TXI for use as a taxiway topology node. For example, the processor(s) 106 of FIG. 1 can identify the TXI for use as a taxiway topology node. This can include, for example, generating the spatial relationship data 122 associated with the TXI that identifies the TXI as a node in the node-edge network.

Although the method 400 is illustrated as including a certain number of steps, more, fewer, and/or different steps can be included in the method 400 without departing from the scope of the subject disclosure. For example, various portions of the method 400 can occur in parallel for a plurality of geospatial objects. As an additional example, the method 400 can include 420—determining whether the TXI is parallel—as part of 412, where the method 400 determines whether the TXI is an intersection.

Figure 5:
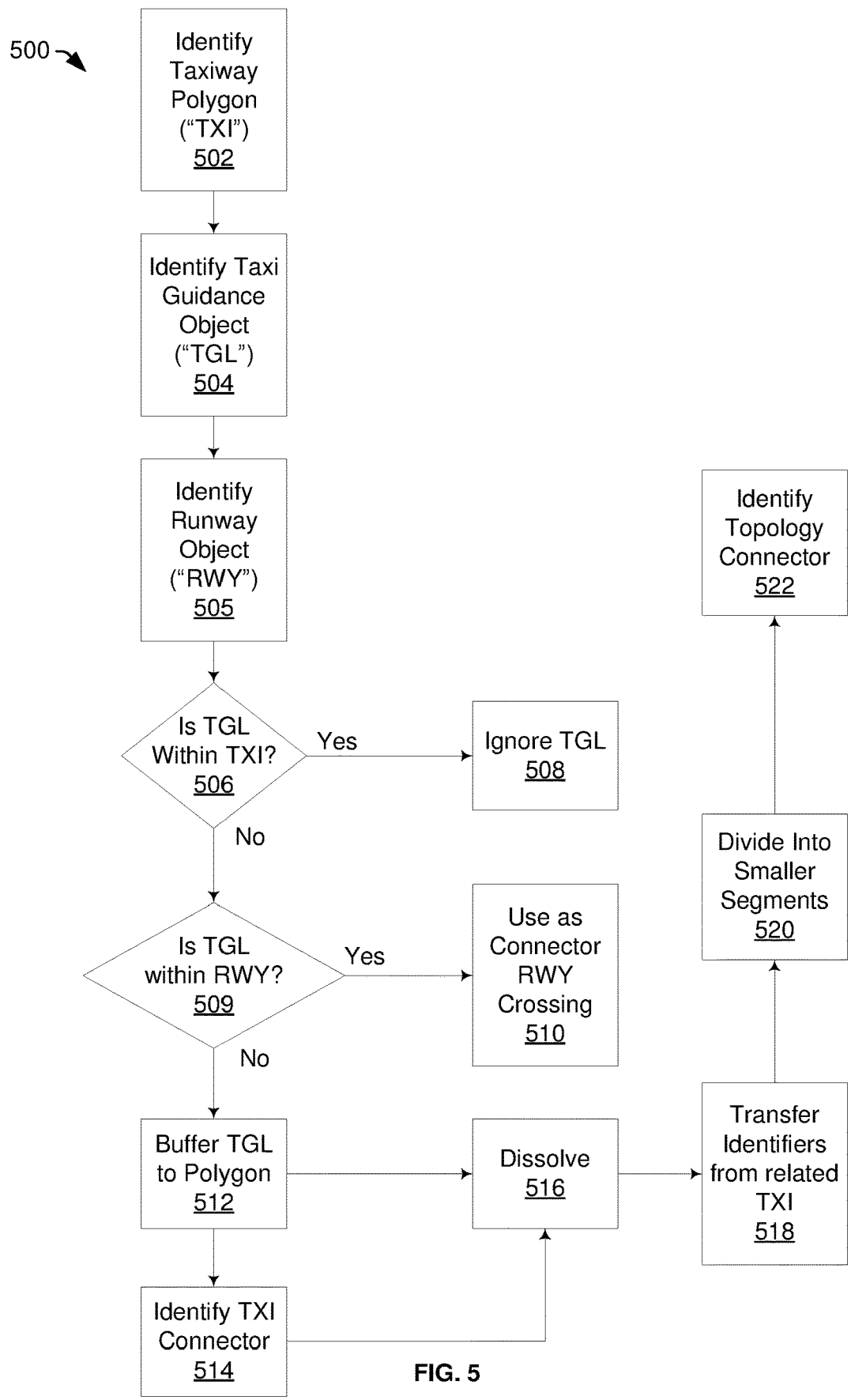
FIG. 5 is a flow chart of an example method for determining one or more topology connectors associated with one or more taxi guidance lines of an airport runway system, in accordance with the subject disclosure.

FIG. 5 is a flow chart of an example method 500 for determining one or more topology connectors associated with one or more taxi guidance lines of an airport runway system, in accordance with the subject disclosure. The method 500 can be initiated, performed, or controlled by one or more processors executing instructions, such as by the processor(s) 106 of FIG. 1 executing instructions from the memory 108. As described in more detail above with reference to FIGS. 1-2, taxi guidance lines can include physical and/or logical objects used to guide an air crew while navigating an airport runway system. Taxi guidance lines can provide, for example, a path for an aircraft along a taxiway. However, as noted above with reference to FIG. 1, data associated with taxi guidance lines may not be included in a particular airport mapping database (e.g., the geospatial data 110 of the AMDB 104 of FIG. 1).

In some implementations, identifying taxi guidance lines between or among a plurality of geospatial objects of an airport runway system can be part of determining a routing relationship between or among the plurality of geospatial objects. If an airport mapping database does not include geospatial data describing polygons associated with the taxi guidance lines, the system 100 of FIG. 1 can generate one or more "topology connectors"—logical objects describing polygons associated with the taxi guidance lines. These polygons can function as nodes to describe a node-edge network.

In some implementations, the method 500 includes, at 502, identifying one or more taxiway polygons ("TXI"). For example, the processor(s) 106 of FIG. 1 can identify one or more taxiway polygons, as described in more detail above with reference to 402 of FIG. 4. The method 500 can also include, at 504, identifying one or more taxi guidance objects ("TGL"). For example, the processor(s) 106 of FIG. 1 can analyze the first geospatial data 116 to determine whether the first geospatial object is and/or includes a taxi guidance object. In a particular example, the processor(s) 106 can analyze the first geospatial data 116 to determine whether the first geospatial object is and/or includes one or more taxi guidance lines. In a particular aspect, one or more fields of the first geospatial data 116 can include data representative of a code or identifier indicating the first geospatial object is and/or includes a taxi guidance object.

In some implementations, the method 500 can also include, at 505, identifying one or more geospatial objects associated with a portion of a runway of the airport runway system ("RWY"). In some aspects, the geospatial data 110 associated with a particular geospatial object can include data indicating whether a particular geospatial object is part of a runway. For example, the processor(s) 106 of FIG. 1 can analyze the first geospatial data 116 associated with the first geospatial object 112A to potentially identify the first geospatial object 112A as an RWY.

In the example of FIG. 5, the method 500 includes, at 506, determining whether the TGL is within the TXI. For example, the processor(s) 106 of FIG. 1 can determine whether the geospatial data 110 associated with the TGL indicates that the TGL is physically located within the TXI. If the TGL is within the TXI, then the method 500 can include, at 508, ignoring the TGL as a potential topology connector.

If the TGL is not within the TXI, then the method 500 can include, at 509, determining whether the TGL is within the RWY. For example, the processor(s) 106 of FIG. 1 can determine whether the geospatial data 110 associated with the TGL indicates that the TGL is physically located within the RWY. If the TGL is within the RWY, then the method 500 can include, at 510, identifying the TGL as a topology connector. Specifically, the TGL can be identified as a runway crossing topology connector. For example, the processor(s) 106 of FIG. 1 can identify the TGL as an RWY Crossing-type topology connector.

If the TGL is not within the RWY, then the method 500 can also include, at 512, buffering the TGL to determine an appropriate buffer zone around the TGL. For example, the processor(s) 106 of FIG. 1 can be configured to generate a polygon describing an area that includes the TGL and any objects within a particular distance (e.g., five feet) of the TGL.

In the example of FIG. 5, the method 500 can also include, at 514, identifying one or more taxiway connectors. For example, the processor(s) 106 of FIG. 1 can identify one or more taxiway connectors associated with the TGL, as described in more detail above with reference to 410 of FIG. 4. In a particular aspect, a taxiway connector is identified if it intersects with a result of the buffering at 512.

In some implementations, the method 500 can also include, at 516, dissolving the polygons generated at 516 into one larger polygon associated with the TGL. For example, the processor(s) 106 of FIG. 1 can dissolve various polygons generated as a result of the buffer operation of 512 into a larger polygon associating the TGL and the taxiway connector identified at 514.

In the example of FIG. 5, the method 500 can also include, at 518, transferring identifiers from related taxiway objects to the polygon generated at 516. For example, as described in more detail above with reference to FIG. 4, geospatial objects having a routing relationship as a result of being part of a common contiguous taxiway can have associated geospatial data that has been updated (e.g., by the processor(s) 106 of FIG. 1) to reflect the identifiers of the other geospatial objects that are part of the common contiguous taxiway. At 518, the processor(s) 106 can be configured to transfer the identifiers of the geospatial objects associated with the taxiway to the data describing the TGL polygon generated at 516. With this, the polygon generated at 516, which can include a continuous taxi guidance line, can have data associated with it that reflects the identifiers of the taxiway geospatial object(s) associated with the taxi guidance line.

In some implementations, the method 500 can also include, at 520, dividing the polygon generated at 516 into smaller segments. This can also include replicating the identification data transferred at 518 to each of the smaller segments. For example, the processor(s) 106 of FIG. 1 can divide the polygon generated at 516 into one or more smaller segments, with each segment associated with data that identifies all of the taxiway geospatial objects associated with the taxi guidance line as a whole.

In the example of FIG. 5, the method 500 can also include, at 522, identifying one or more topology connectors for use by other components of the system 100 of FIG. 1. For example, the processor(s) 106 of FIG. 1 can identify one or more of the smaller segments generated at 520 as potential topology connectors.

Although the method 500 is illustrated as including a certain number of steps, more, fewer, and/or different steps can be included in the method 500 without departing from the scope of the subject disclosure. For example, various portions of the method 500 can occur in parallel for a plurality of geospatial objects. As an additional example, the method 500 can receive information identifying the taxiway polygons, taxi guidance objects, runway objects, etc., rather than identifying those objects.

Figure 6:
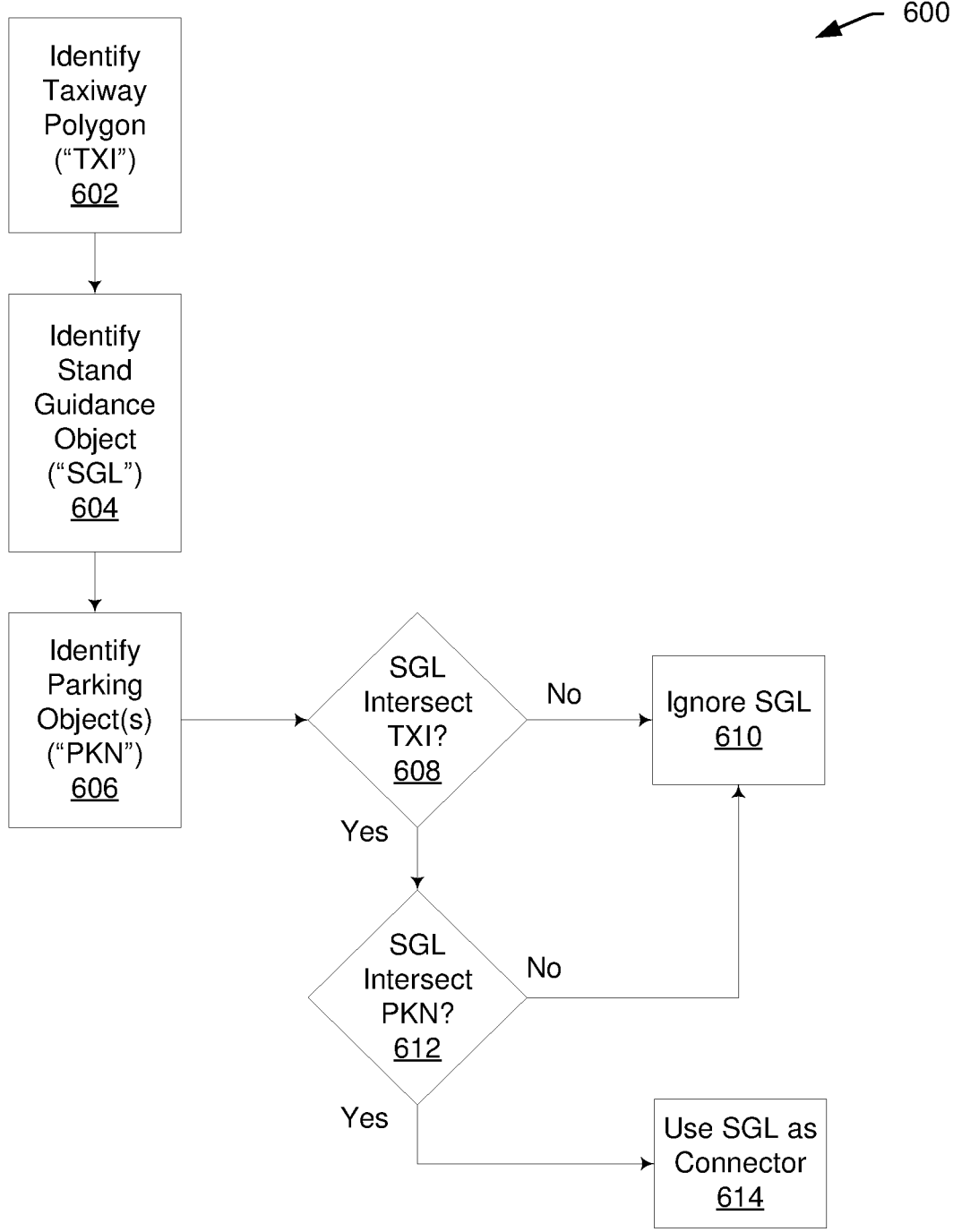
FIG. 6 is a flow chart of an example method for determining one or more topology connectors associated with one or more parking stand guidance lines of an airport runway system, in accordance with the subject disclosure.

FIG. 6 is a flow chart of an example method 600 for determining one or more topology connectors associated with one or more parking stand guidance lines of an airport runway system, in accordance with the subject disclosure. The method 600 can be initiated, performed, or controlled by one or more processors executing instructions, such as by the processor(s) 106 of FIG. 1 executing instructions from the memory 108. Similar to taxi guidance lines, parking stand guidance lines can include physical and/or logical objects used to guide an air crew while navigating an airport runway system. Parking stand guidance lines can provide, for example, a path for an aircraft from a taxiway to a parking stand. However, as noted above with reference to FIG. 1, data associated with parking stand guidance lines may not be included in a particular airport mapping database (e.g., the geospatial data 110 of the AMDB 104 of FIG. 1).

In some implementations, identifying parking stand guidance lines between or among a plurality of geospatial objects of an airport runway system can be part of determining a routing relationship between or among the plurality of geospatial objects. If an airport mapping database does not include geospatial data describing polygons associated with the parking stand guidance lines, the system 100 of FIG. 1 can generate one or more "topology connectors"—logical objects describing polygons associated with the parking stand guidance lines. These polygons can function as nodes to describe a node-edge network.

In the example of FIG. 6, the method 600 can include, at 602, identifying one or more taxiway polygons ("TXI"). For example, the processor(s) 106 of FIG. 1 can identify one or more taxiway polygons, as described in more detail above with reference to 402 of FIG. 4. The method 600 can also include, at 604, identifying one or more parking stand guidance objects ("SGL"). For example, the processor(s) 106 of FIG. 1 can analyze the first geospatial data 116 to determine whether the first geospatial object is and/or includes a parking stand guidance object. In a particular example, the processor(s) 106 can analyze the first geospatial data 116 to determine whether the first geospatial object is and/or includes one or more stand guidance lines. In a particular aspect, one or more fields of the first geospatial data 116 can include data representative of a code or identifier indicating the first geospatial object is and/or includes a parking stand guidance object.

In some implementations, the method 600 can also include, at 606, identifying one or more parking objects ("PKN"). For example, the processor(s) 106 of FIG. 1 can identify parking-related geospatial objects, as described in more detail above with reference to 418 of FIG. 4.

In the example of FIG. 6, the method 600 can also include, at 608, determining whether the SGL intersects the TXI. For example, the processor(s) 106 of FIG. 1 can determine whether the stand guidance objects intersect one or more of the taxiway-related geospatial objects. In a particular example, the processor(s) 106 can perform one or more spatial operations to determine whether the SGL intersects the TXI. If the SGL does not intersect the TXI, the method 600 can also include, at 610, ignoring the particular SGL as a potential topology connector.

If the SGL does intersect the TXI, the exemplary method 600 can also include, at 612, determining whether the SGL intersects the PKN. For example, the processor(s) 106 of FIG. 1 can determine whether the stand guidance objects intersect one or more of the parking-related geospatial objects. In a particular example, the processor(s) 106 can perform one or more spatial operations to determine whether the SGL intersects the PKN. If the SGL does not intersect the PKN, the method 600 can also include, at 610, ignoring the particular SGL as a potential topology connector. If the SGL does intersect the PKN, the method 600 can also include, at 614, identifying the SGL for use as a topology connector.

Although the method 600 is illustrated as including a certain number of steps, more, fewer, and/or different steps can be included in the method 600 without departing from the scope of the subject disclosure. For example, various portions of the method 600 can occur in parallel for a plurality of geospatial objects. As an additional example, the method 600 can receive information identifying the taxiway polygons, parking stand guidance objects, parking objects, etc., rather than identifying those objects.

Figure 7:
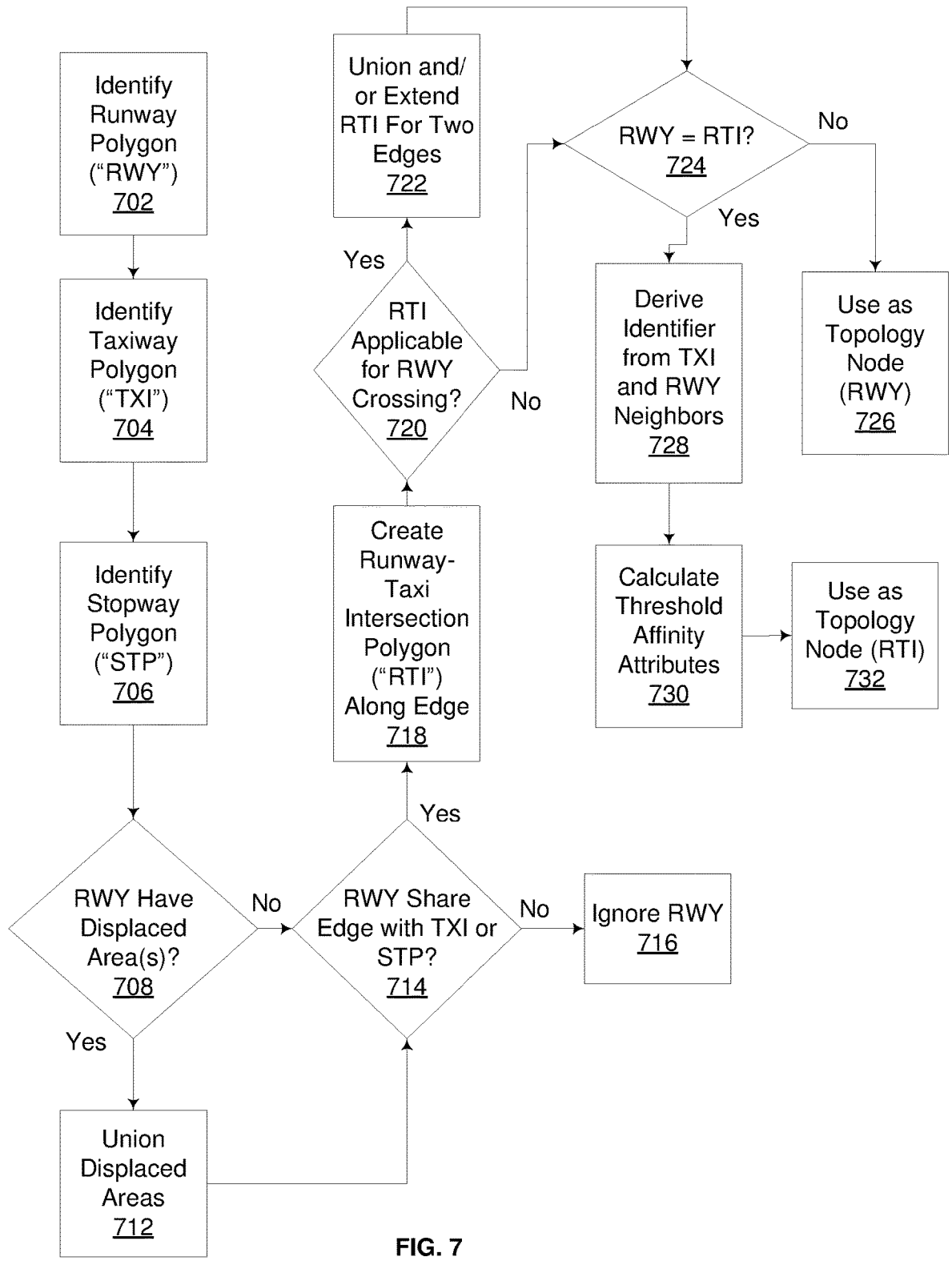
FIG. 7 is a flow chart of an example method for determining one or more topology nodes to describe a runway and/or runway intersection portion of an airport runway system, in accordance with the subject disclosure.

FIG. 7 is a flow chart of an example method 700 for determining one or more topology nodes to describe a runway and/or runway intersection portion of an airport runway system, in accordance with the subject disclosure. The method 700 can be initiated, performed, or controlled by one or more processors executing instructions, such as by the processor(s) 106 of FIG. 1 executing instructions from the memory 108.

In some implementations, the method 700 includes, at 702, identifying one or more runway polygons ("RWY"). For example, the processor(s) 106 of FIG. 1 can analyze the geospatial data 110 to identify one or more runway polygons, as described in more detail above with reference to 505 of FIG. 5.

In the example of FIG. 7, the method 700 also includes, at 704, identifying one or more taxiway polygons ("TXI"). For example, the processor(s) 106 of FIG. 1 can analyze the geospatial data 110 to identify one or more taxiway polygons, as described in more detail above with reference to 402 of FIG. 4.

In the example of FIG. 7, the method 700 also includes, at 706, identifying one or more stopway polygons ("STP").

In some aspects, the geospatial data 110 associated with a particular geospatial object can include data indicating whether a particular geospatial object is part of a stopway region. A stopway region of an airport runway system can include, for example, a runway extension area used for aborted and/or rejected takeoff attempts. For example, the processor(s) 106 of FIG. 1 can analyze the first geospatial data 116 associated with the first geospatial object 112A to potentially identify the first geospatial object 112A as an STP.

In the example of FIG. 7, the method 700 also includes, at 708, determining whether the RWY includes one or more displaced areas. In some aspects, the geospatial data 110 associated with a particular geospatial object can include data indicating whether a particular geospatial object includes one or more displaced areas. A displaced area of an airport runway system can include, for example, areas that are set aside for departure operations, but not currently in use for landing operations.

If the RWY includes a displaced area, the method 700 can include, at 712, combining all of the displaced areas included with the RWY. For example, the processor(s) 106 of FIG. 1 can perform a union operation, combining the geospatial data associated with the various displaced areas. The method 700 can then include, at 714, determining whether the RWY shares and edge with a TXI and/or a STP, which the method 700 can also include if the RWY does not have any displaced area(s). As described in more detail above with reference to FIGS. 1-3, the processor(s) 106 of FIG. 1 can analyze the edges that have been identified describing a routing relationship associated with the RWY, TXI, and/or STP to determine whether the RWY shares one or more edges with a TXI and/or STP.

If the RWY does not share an edge with a TXI and/or an STP, the method 700 can include, at 716, ignoring the RWY as a potential topology node. If the RWY does share an edge with a TXI and/or STP, the method 700 can include, at 718, creating a runway-taxi intersection polygon ("RTI") along the shared edge. As described in more detail above with reference to FIGS. 4-6, the processor(s) 106 of FIG. 1 can create one or more logical objects in order to better describe a node-edge network. In some implementations, an RTI polygon can be one such logical object. In the example of FIG. 7, the RTI polygon can be used as a node in the node-edge network, describing a runway intersection as part of a routing relationship between or among the RWY and the TXI and/or STP.

In the example of FIG. 7, the method 700 can also include, at 720, determining whether the RTI is applicable for a runway crossing. For example, the processor(s) 106 of FIG. 1 can determine whether the RTI intersects with one or more other RTI. If the RTI is applicable for a runway crossing, the method 700 can include, at 722, extending the RTI to include adjoining geospatial objects. For example, the processor(s) 106 of FIG. 1 can perform a union operation on the geospatial data 110 describing the two edges away from the RTI. In some aspects, the resulting data can describe a runway intersection area that includes data describing runway polygons connected to the runway intersection area. The method 700 can then proceed to determine, at 724, whether the RWY and the RTI are equivalent, which can also occur if the RTI is not applicable for a runway crossing. In some implementations, equivalence between the RWY and the RTI can be based on a comparison of the geospatial data describing the RWY and the RTI and finding equivalence if all values in all data fields are equivalent.

If the RWY and RTI are not equivalent, the method 700 can include, at 726, identifying the RWY for use as a runway topology node. As described in more detail above with reference to FIGS. 1-6, a topology node can be used to describe a node in the node-edge network, describing a routing relationship associated with the runway-related geospatial objects.

If the RWY and RTI are equivalent, the method 700 can include, at 728, deriving identifiers from the TXI and RWY neighbors. As described in more detail above with reference to FIGS. 1-6, the processor(s) 106 of FIG. 1 can identify one or more geospatial objects that are neighbors of the RTI polygon. In a particular aspect, the processor(s) 106 can identify those neighbors that are identified as taxi-related and runway-related geospatial objects. As described in more detail above with reference to 418 of FIG. 4, the processor(s) 106 of FIG. 1 can be configured to derive various identifiers from the appropriate neighbors for use as geospatial data describing a routing relationship between or among the RTI and the appropriate neighbors.

In the example of FIG. 7, the method 700 can also include, at 730, calculating threshold affinity attributes. Affinity attributes can include, for example, points within and/or associated with a geospatial object that can identify particular points of interest and/or importance associated with the airport runway system. For example, affinity attributes can include a point within a geospatial object identifying a beginning and/or an end of a particular runway.

In some implementations, the method 700 can also include, at 732, identifying the RTI polygon for use as a runway-taxi intersection topology node. For example, the processor(s) 106 of FIG. 1 can identify the RTI polygon for use as a runway-taxi intersection topology node. This can include, for example, generating the spatial relationship data 122 associated with the RTI that identifies the RTI as a node in the node-edge network.

Although the method 700 is illustrated as including a certain number of steps, more, fewer, and/or different steps can be included in the method 700 without departing from the scope of the subject disclosure. For example, various portions of the method 700 can occur in parallel for a plurality of geospatial objects. As an additional example, the method 700 can receive information identifying the taxiway polygons, stopway polygons, runway polygons, rather than identifying those objects.

Figure 8:
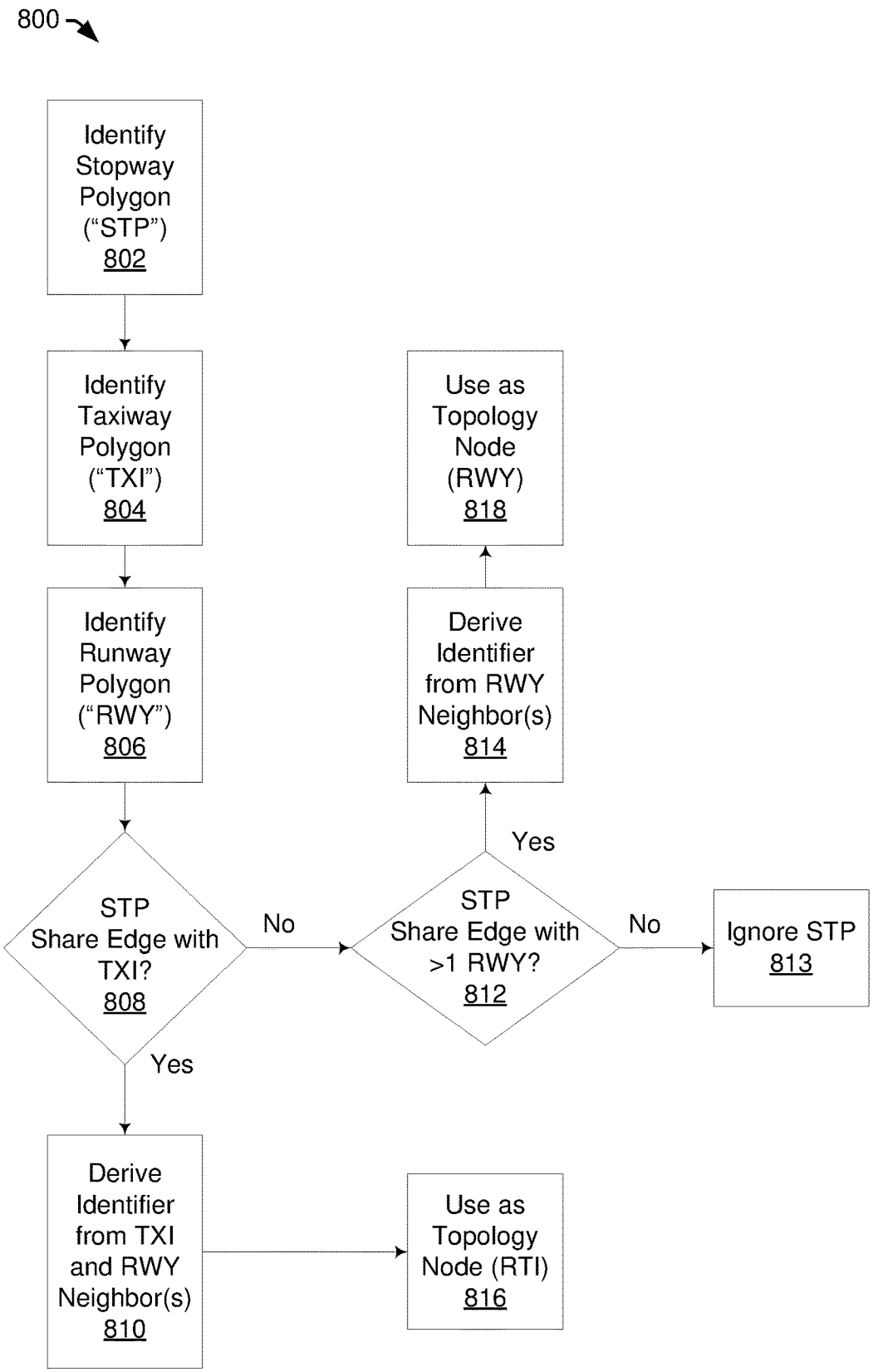
FIG. 8 is a flow chart of another example method for determining one or more topology nodes to describe a runway and/or runway intersection portion of an airport runway system, in accordance with the subject disclosure.

FIG. 8 is a flow chart of another example method 800 for determining one or more topology nodes to describe a runway and/or runway intersection portion of an airport runway system, in accordance with the subject disclosure. The method 800 can be initiated, performed, or controlled by one or more processors executing instructions, such as by the processor(s) 106 of FIG. 1 executing instructions from the memory 108.

In the example of FIG. 8, the method 800 also includes, at 802, identifying one or more stopway polygons ("STP"), as described in more detail above with reference to 706 of FIG. 7. In some implementations, the method 800 also includes, at 804, identifying one or more taxiway polygons ("TXI"). For example, the processor(s) 106 of FIG. 1 can analyze the geospatial data 110 to identify one or more taxiway polygons, as described in more detail above with reference to 402 of FIG. 4.

In the example of FIG. 8, the method 800 includes, at 806, identifying one or more runway polygons ("RWY"). For example, the processor(s) 106 of FIG. 1 can analyze the geospatial data 110 to identify one or more runway polygons, as described in more detail above with reference to 505 of FIG. 5.

In the example of FIG. 8, the method 800 also includes, at 808, determining whether the STP shares an edge with the TXI, as described in more detail above with reference to 714 of FIG. 7. If the STP shares an edge with the TXI, the method 800 can include, at 810, deriving identifiers from appropriate TXI and RWY neighbors, as described in more detail above with reference to 728 of FIG. 7. The method 800 can then include, at 816, identifying the STP for use as a runway-taxi intersection topology node, as described in more detail above with reference to 732 of FIG. 7.

If, at 808, the STP does not share an edge with the TXI, the method 700 can include, at 812, determining whether the STP shares an edge with one or more runway-related geospatial objects, as described in more detail above with reference to 714 of FIG. 7. If the STP does not share an edge with one or more runway-related geospatial objects, the method 800 can include, at 813, ignoring the STP for use as a topology node.

If the STP shares and edge with one or more runway-related geospatial objects, the method 800 can include, at 814, deriving identifiers from appropriate RWY neighbors, as described in more detail above with reference to 728 of FIG. 7. The method 800 can then include, at 818, identifying the STP for use as a runway topology node, as described in more detail above with reference to 726 of FIG. 7.

Although the method 800 is illustrated as including a certain number of steps, more, fewer, and/or different steps can be included in the method 800 without departing from the scope of the subject disclosure. For example, various portions of the method 800 can occur in parallel for a plurality of geospatial objects. As an additional example, the method 800 can receive information identifying the taxiway polygons, stopway polygons, runway polygons, rather than identifying those objects.

Figure 9:
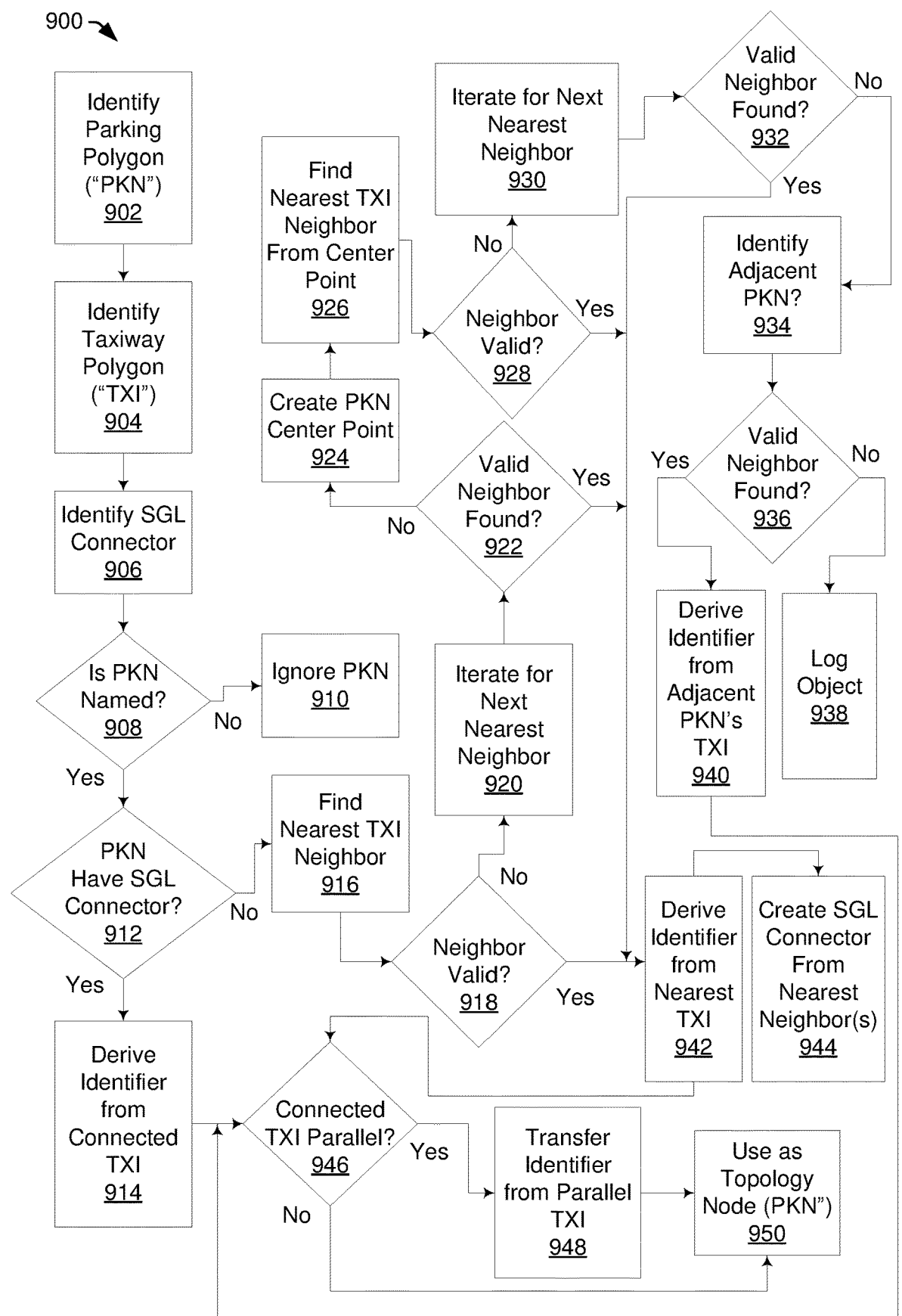
FIG. 9 is a flow chart of an example method for determining one or more topology nodes to describe a parking area of an airport runway system, in accordance with the subject disclosure.

FIG. 9 is a flow chart of an example method 900 for determining one or more topology nodes to describe a parking area of an airport runway system, in accordance with the subject disclosure. The method 900 can be initiated, performed, or controlled by one or more processors executing instructions, such as by the processor(s) 106 of FIG. 1 executing instructions from the memory 108.

In the example of FIG. 9, the method 900 can include, at 902, identifying one or more parking-related polygons ("PKN") describing parking-related geospatial objects, as described in more detail above with reference to 606 of FIG. 6. The method 900 can also include, at 904, identifying one or more taxiway-related polygons ("TXI") describing taxiway-related geospatial objects, as described in more detail above with reference to 402 of FIG. 4. The method 900 can also include, at 906, identifying one or more stand guidance object connectors, as described in more detail above with reference to 614 of FIG. 6.

In the example of FIG. 9, the method 900 can also include, at 908, determining whether the PKN is named. Exemplary methods of determining whether a polygon describing a geospatial object is named are described in more detail above with reference to 408 of FIG. 4. If the PKN is not named, the method 900 can include, at 910, ignoring the PKN for use as a topology node.

If the PKN is named, the method 900 can also include, at 912, determining whether the PKN has an associated stand guidance object connector. As described in more detail above with reference to FIG. 6, the processor(s) 106 of FIG. 1 can identify a stand guidance object as a topology connector based at least on an analysis of the PKN. In the example of FIG. 9, if a stand guidance connector exists that is associated with the PKN of FIG. 9, the method 900 can then proceed to, at 914, derive identifiers from taxiway-related geospatial objects connected to the PKN, as described in more detail above with reference to 418 of FIG. 4.

The method 900 can then include, at 946, determining whether the TXI is classified as "parallel", as described in more detail above with reference to 420 of FIG. 4. If the TXI is parallel, the method 900 can include, at 948, transferring identifiers from parallel TXI to the geospatial data describing the TXI under analysis, as described in more detail above with reference to 422 of FIG. 4. The method 900 can then proceed, at 950, to identify the PKN for use as a parking-related topology node, which can also be included if the connected TXI is not parallel. For example, the processor(s) 106 of FIG. 1 can identify the PKN for use as a parking topology node. This can include, for example, generating the spatial relationship data 122 associated with the PKN that identifies the PKN as a node in the node-edge network.

Referring again to 912, if the PKN does not have an associated stand guidance connector, the method 900 can include, at 916, finding one or more nearest taxiway-related neighbors to the PKN, as described in more detail above with reference to 414 of FIG. 4, 728 of FIG. 7, and 810 of FIG. 8. The method can then include, at 918, determining whether the nearest identified neighbor is valid. In some aspects, determining whether the neighbor is valid can include determining whether a path to get to the neighbor would cross an object that an airplane cannot cross (e.g., building, water, etc.).

If a valid neighbor is found, the method 900 can proceed to, at 942, derive identifiers from the nearest TXI, as described in more detail above with reference to 810 of FIG. 8. Once the identifier(s) are derived, the method 900 can proceed to 946, as described in more detail above. In the example of FIG. 9, the method 900 can also include, at 944, creating a stand guidance-related topology connector from the coordinates associated with the valid nearest neighbor. Creating a stand guidance-related topology connector is described in more detail above with reference to 614 of FIG. 6. In some aspects, the method 900 can include the performance of 944 and 946 simultaneously.

Referring again to 918, if no valid neighbor is found, the method 900 can proceed to, at 920, repeat the analysis of 918 for each next-nearest neighbor. In some aspects, the number of iterations of this analysis can be limited to a particular threshold (e.g., the six nearest neighbors). Once the iterative analysis is complete, the method 900 can proceed to, at 922, determine whether the iteratively analyzed neighbors are valid, as described above with reference to 918. In some implementations, the method 900 can perform a validity analysis on all identified neighbors at once. In alternative implementations, the method 900 can analyze each analyzed nearest neighbor to determine whether the neighbor is valid before moving on to the next nearest neighbor.

If a valid neighbor is found, the method 900 can proceed to 942, as described in more detail above. If no valid neighbor is found, the method 900 can include, at 924, creating a parking center point. This can include, for example, the processor(s) 106 of FIG. 1 identifying a geographic center point within the parking-related polygon.

In the example of FIG. 9, the method 900 can also include, at 926, finding a nearest taxiway-related neighbor from the parking center point. As described above with reference to 916, the processor(s) 106 of FIG. 1 can identify one or more nearest taxiway-related neighbors. At 926, the processor(s) 106 can use as a starting point the parking center point rather than the PKN as a whole.

In the example of FIG. 9, the method 900 can also include, at 928, determining whether the identified neighbor is valid, as described in more detail above with reference to 922. In some implementations, the method 900 can also include, at 930, repeating the analysis of 928 for each next-nearest neighbor. In some aspects, the number of iterations of this analysis can be limited to a particular threshold (e.g., the six next-nearest neighbors). Once the iterative analysis is complete, the method 900 can proceed to, at 932, determine whether the iteratively analyzed neighbors are valid, as described above with reference to 918. In some implementations, the method 900 can perform a validity analysis on all identified neighbors at once. In alternative implementations, the method 900 can analyze each analyzed nearest neighbor to determine whether the neighbor is valid before moving on to the next nearest neighbor.

If a valid neighbor is found, the method 900 can proceed to 942, as describe in more detail above. If no valid neighbor is found, the method 900 can include, at 934, identifying an adjacent PKN. In the example of FIG. 9, the method 900 can include, at 936, determining whether the adjacent PKN is a valid neighbor, as described above with reference to 918. If the neighbor is not valid, the method 900 can include, at 938, an instruction to log the PKN as an error. If the adjacent PKN is a valid neighbor, the method 900 can include, at 940, deriving identifiers from the polygons describing taxiway-related geospatial objects adjacent to the PKN. The method 900 can then proceed to 946, as described in more detail above.

Although the method 900 is illustrated as including a certain number of steps, more, fewer, and/or different steps can be included in the method 900 without departing from the scope of the subject disclosure. For example, various portions of the method 900 can occur in parallel for a plurality of geospatial objects. As an additional example, the method 900 can receive information identifying the taxiway polygons, parking polygons, stand guidance connectors, rather than identifying those objects.

Figure 10:
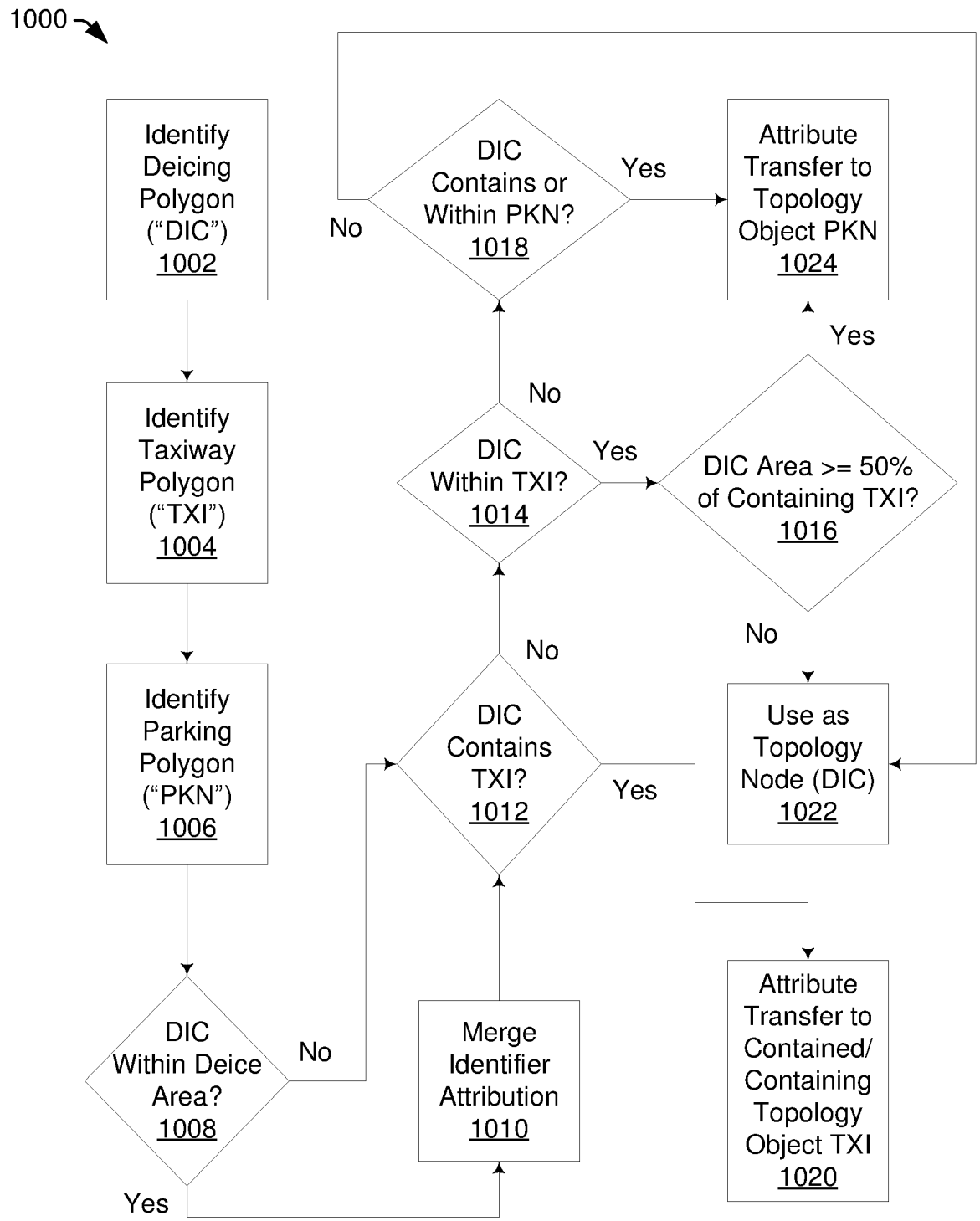
FIG. 10 is a flow chart of an example method for determining one or more topology nodes to describe a deicing area of an airport runway system, in accordance with the subject disclosure.

FIG. 10 is a flow chart of an example method 1000 for determining one or more topology nodes to describe a deicing area of an airport runway system, in accordance with the subject disclosure. The method 1000 can be initiated, performed, or controlled by one or more processors executing instructions, such as by the processor(s) 106 of FIG. 1 executing instructions from the memory 108.

In some implementations, the method 1000 can include, at 1002, identifying one or more deicing-related polygons ("DIC") describing deicing-related geospatial objects. For example, the processor(s) 106 of FIG. 1 can analyze the geospatial data 110 to determine whether a geospatial object is part of a deicing area. In a particular aspect, one or more fields of the geospatial data 110 can include data representative of a code or identifier indicating the geospatial object as part of a deicing area.

The method 1000 can also include, at 1004, identifying one or more taxiway-related polygons ("TXI") describing taxiway-related geospatial objects, as described in more detail above with reference to 402 of FIG. 4. The method 1000 can also include, at 1006, identifying one or more parking-related polygons ("PKN"), as described in more detail above with reference to 606 of FIG. 6.

In the example of FIG. 10, the method 1000 can include, at 1008, determining whether the DIC is within a deicing area. For example, the processor(s) 106 of FIG. 1 can be configured to perform one or more spatial operations to determine whether the DIC is within the deicing area. If the DIC is within a deicing area, the method 1000 can include, at 1010, merging identifier attribution. For example, the processor(s) 106 of FIG. 1 can be configured to merge one or more data values identifying a larger deicing area with the data associated with the DIC. In a particular example, if a DIC is part of a larger deicing area (e.g., "Central Deicing Pad"), along with other geospatial objects, the data associated with the DIC can be updated to include a merged value associated with the larger deicing area.

Once the identifier attribution is merged, the method 1000 can also include, at 1012, determining whether the DIC contains one or more TXI, which can also be included if the DIC is not within a deicing area. As described in more detail above with reference to 509 of FIG. 5, the processor(s) 106 of FIG. 1 can be configured to determine whether one polygon contains another polygon.

If the DIC contains one or more TXI, the method 1000 can include, at 1020, transferring attribute to the TXI contained by the DIC. If the DIC does not contain one or more TXI, the method 1000 can include, at 1014, determining whether the DIC is within a TXI. If the DIC is within the TXI, the method 1000 can include, at 1016, determining whether the area of the DIC is greater than a particular threshold (e.g., 50%) of the area of the TXI containing the DIC. If that threshold is met, the method 1000, can proceed to, at 1024, transfer attributes of the DIC to the parking-related topology object. If that threshold is not met, the method 1000 can proceed to, at 1022, identify the DIC for use as a deicing-related topology node. For example, the processor(s) 106 of FIG. 1 can identify the DIC for use as a deicing topology node. This can include, for example, generating the spatial relationship data 122 associated with the DIC that identifies the DIC as a node in the node-edge network.

Referring again to 1014, if the DIC is not within the TXI, the method 1000 can include, at 1018, determining whether the DIC contains or is within the PKN. If the DIC is contained or within the PKN, the method 1000 can proceed to, at 1024, transfer attributes of the DIC to the parking-related topology object. If the DIC is not contained or within the PKN, the method 1000 can proceed to 1022, as described above.

Although the method 1000 is illustrated as including a certain number of steps, more, fewer, and/or different steps can be included in the method 1000 without departing from the scope of the subject disclosure. For example, various portions of the method 1000 can occur in parallel for a plurality of geospatial objects. As an additional example, the method 1000 can receive information identifying the deicing polygons, taxiway polygons, parking polygons, rather than identifying those objects.

Figure 11:
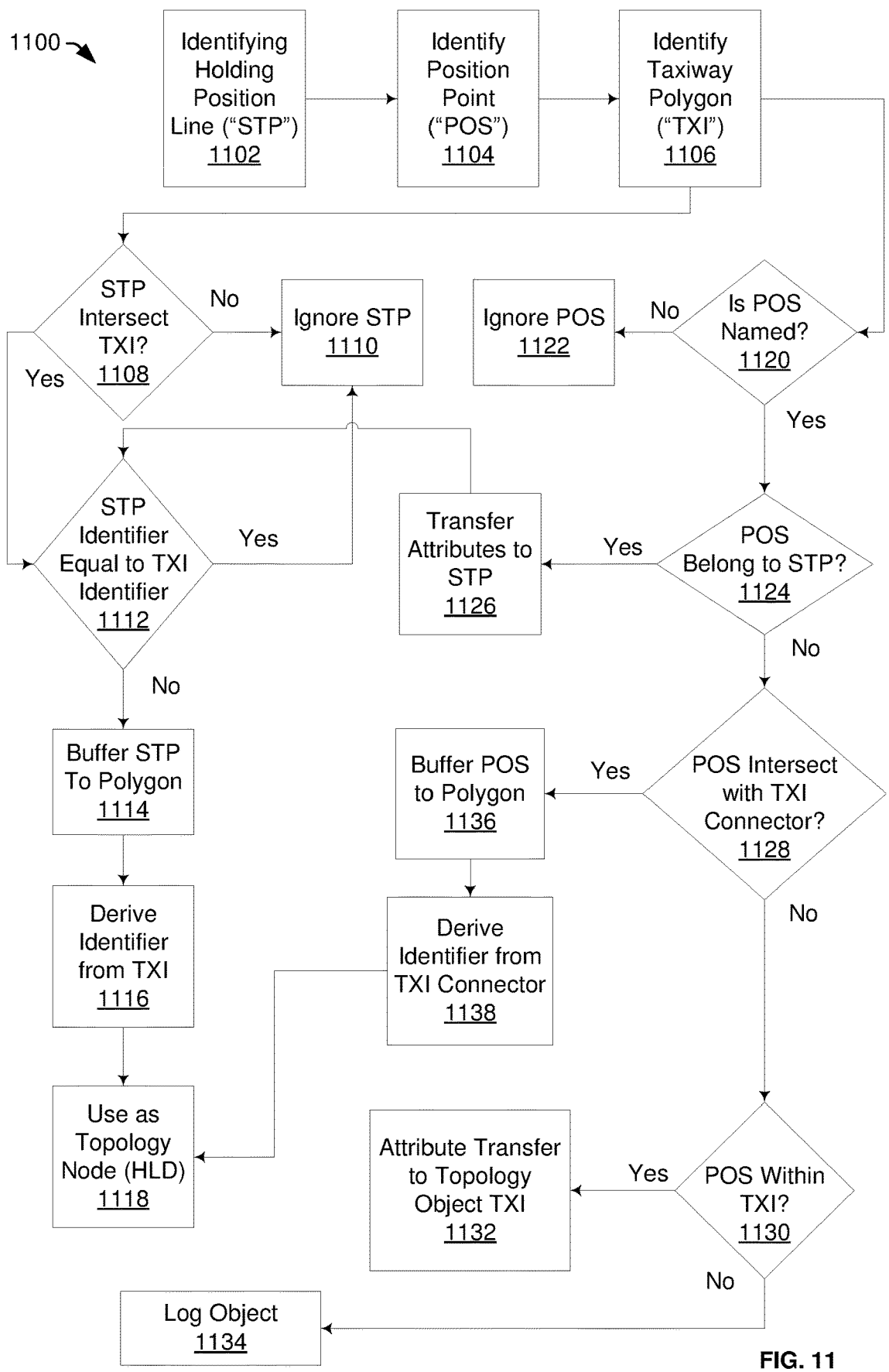
FIG. 11 is a flow chart of an example method for determining one or more topology nodes to describe a taxi holding area of an airport runway system, in accordance with the subject disclosure.

FIG. 11 is a flow chart of an example method 1100 for determining one or more topology nodes to describe a taxi holding area of an airport runway system, in accordance with the subject disclosure. The method 1100 can be initiated, performed, or controlled by one or more processors executing instructions, such as by the processor(s) 106 of FIG. 1 executing instructions from the memory 108.

In some implementations, the method 1100 can include, at 1102, identifying one or more holding position line-related polygons ("STP") describing holding position line-related geospatial objects. For example, the processor(s) 106 of FIG. 1 can analyze the geospatial data 110 to determine whether a geospatial object is part of a holding position line (e.g., a point within the airport runway system identifying where an aircraft should hold in the taxiing process). In a particular aspect, one or more fields of the geospatial data 110 can include data representative of a code or identifier indicating the geospatial object as part of a holding position line.

In some implementations, the method 1100 can include, at 1104, identifying one or more position point-related polygons ("POS") describing position point-related geospatial objects. For example, the processor(s) 106 of FIG. 1 can analyze the geospatial data 110 to determine whether a geospatial object is part of a position point (e.g., a point within a runway or taxiway to indicate where an aircraft should hold its position). In a particular aspect, one or more fields of the geospatial data 110 can include data representative of a code or identifier indicating the geospatial object as part of a position point.

The method 1100 can also include, at 1106, identifying one or more taxiway-related polygons ("TXI") describing taxiway-related geospatial objects, as described in more detail above with reference to 402 of FIG. 4.

In the example of FIG. 11, the method 1100 can include, at 1108, determining whether the STP intersects the TXI. As described in more detail above with reference to 612 of FIG. 6, the processor(s) 106 of FIG. 1 can be configured to determine whether one polygon intersects another. If the STP does not intersect the TXI, the method 1100 can include, at 1110, ignoring the STP for use as a topology node.

If the STP does intersect the TXI, the method 1100 can include, at 1112, determining whether an identifier associated with the STP is equal to an identifier associated with the TXI. If the identifiers are equal, the method 1100 can proceed to 1110, as described above.

If the STP identifier and the TXI identifier are not equal, the method 1100 can include, at 1114, buffering the STP to generate a holding position line polygon. An exemplary process of buffering is described in more detail above with reference to 512 of FIG. 5. In the example of FIG. 11, the method 1100 can also include, at 1116, deriving one or more identifiers from the TXI, as described in more detail above with reference to, for example, 414 of FIG. 4. The method 1100 can also include, at 1118, identifying the STP for use as a taxi holding-related topology node. For example, the processor(s) 106 of FIG. 1 can identify the STP for use as a taxi holding topology node. This can include, for example, generating the spatial relationship data 122 associated with the STP that identifies the STP as a node in the node-edge network.

In some implementations, the method 1100 also includes, at 1120, determining whether the POS is named. Exemplary methods of determining whether a polygon is named are described in more detail above with reference to, for example, 408 of FIG. 4. If the POS is not named, the method 1100 can include, at 1122, ignoring the POS as a potential topology node.

If the POS is named, the method 1100 can include, at 1124, determining whether the POS belongs to the STP. In a particular aspect, the processor(s) 106 of FIG. 1 can determine whether the POS belongs to the STP by analyzing whether a distance between the POS and the STP is within a particular threshold (e.g., eight meters). If the POS belongs to the STP, the method 1100 can proceed to, at 1126, transfer attributes of the POS to the STP. The method 1100 can then proceed to 1112, as described in more detail above.

If the POS does not belong to the STP, the method 1100 can include, at 1128, determining whether the POS intersects with a taxiway-related connector. Taxiway connectors are described in more detail above with reference to 410 of FIG. 4. If the POS intersects with a TXI connector, the method 1100 can proceed to, at 1136, buffer the POS to a larger polygon, as described above with reference to 1114. In the example of FIG. 11, the method 1100 can then include, at 1138, deriving one or more identifiers from the TXI connector. The method 1100 can then proceed to identify the POS as a holding area-related topology node as described above with reference to 1118.

Referring again to 1128, if the POS does not intersect with a TXI connector, the method 1100 can include, at 1130, determining whether the POS is within the TXI. If the POS is within the TXI, the method 1100 can include, at 1132, transferring attributes of the POS to the containing TXI. If the POS is not within the TXI, the method 1100 can include, at 1134, logging the POS as an error.

Although the method 1100 is illustrated as including a certain number of steps, more, fewer, and/or different steps can be included in the method 1100 without departing from the scope of the subject disclosure. For example, various portions of the method 1100 can occur in parallel for a plurality of geospatial objects. As an additional example, the method 1100 can receive information identifying the taxiway polygons, holding position line polygons, position point polygons, etc., rather than identifying those objects.

Figure 12:
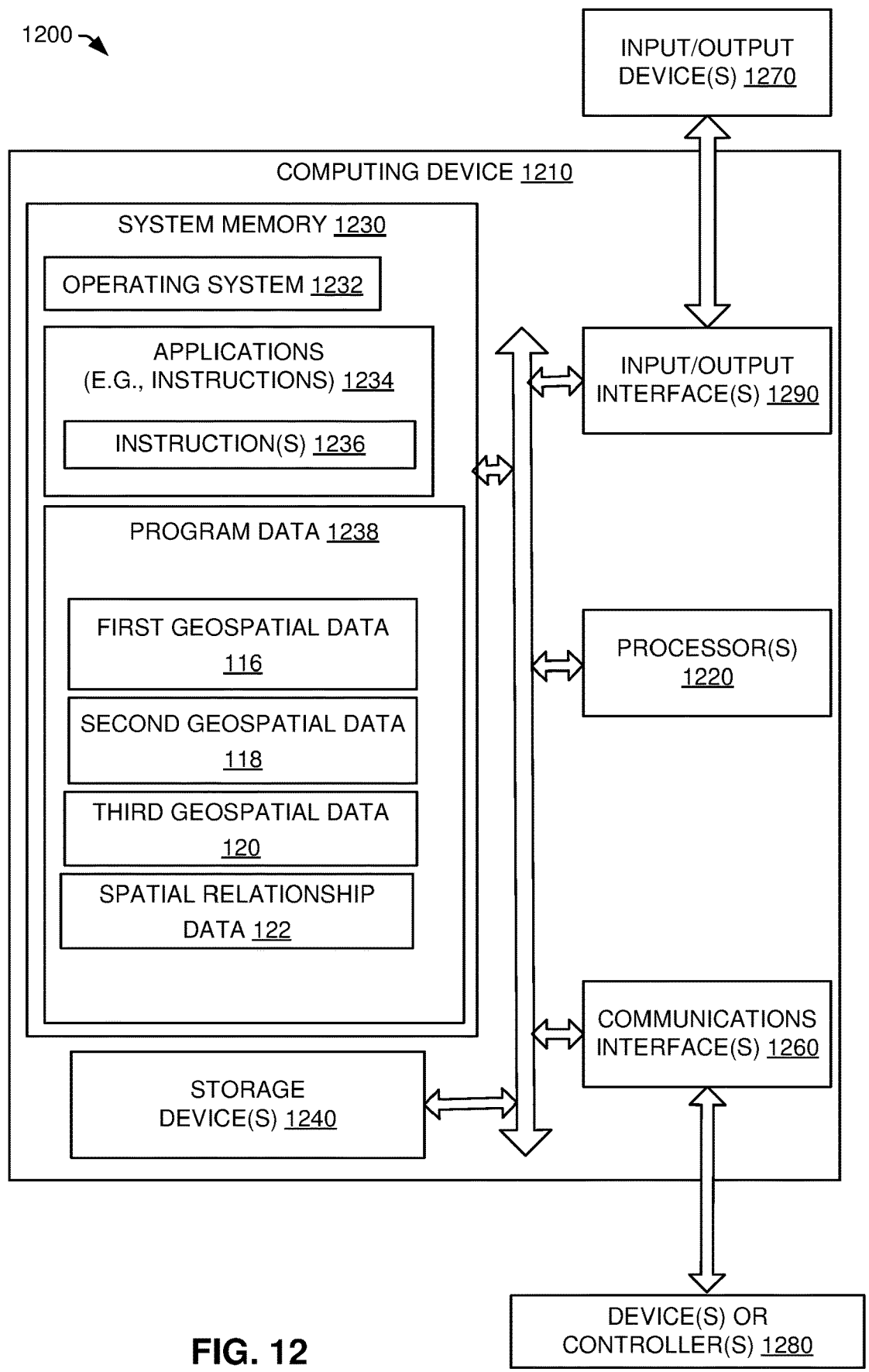
FIG. 12 is a block diagram of a computing environment including a computing device configured to support aspects of computer-implemented methods and computer-executable program instructions (or code) according to the subject disclosure.

FIG. 12 is a block diagram of a computing environment 1200 including a computing device 1210 configured to support aspects of computer-implemented methods and computer-executable program instructions (or code) according to the subject disclosure. For example, the computing device 1210, or portions thereof, is configured to execute instructions to initiate, perform, or control one or more operations described in more detail above with reference to FIGS. 1-11. In a particular aspect, the computing device 1210 can include the computing device 102 and/or the AMDB 104 of FIG. 1, one or more servers, one or more virtual devices, or a combination thereof.

The computing device 1210 includes one or more processors 1220. In a particular aspect, the processor(s) 1220 correspond to the processor(s) 106 of FIG. 1. The processor(s) 1220 are configured to communicate with system memory 1230, one or more storage devices 1240, one or more input/output interfaces 1290, one or more communications interfaces 1260, or any combination thereof. The system memory 1230 includes volatile memory devices (e.g., random access memory (RAM) devices), nonvolatile memory devices (e.g., read-only memory (ROM) devices, programmable read-only memory, and flash memory), or both. The system memory 1230 stores an operating system 1232, which can include a basic input/output system for booting the computing device 1210 as well as a full operating system to enable the computing device 1210 to interact with users, other programs, and other devices. The system memory 1230 stores system (program) data 1238, such as the instructions 1236, the first geospatial data 116, the second geospatial data 118, the third geospatial data 120, the spatial relationship data 122 of FIG. 1, or a combination thereof.

The system memory 1230 includes one or more applications 1234 (e.g., sets of instructions) executable by the processor(s) 1220. As an example, the one or more applications 1234 include the instructions 1236 executable by the processor(s) 1220 to initiate, control, or perform one or more operations described with reference to FIGS. 1-11. To illustrate, the one or more applications 1234 include the instructions 1236 executable by the processor(s) 1220 to initiate, control, or perform one or more operations described with reference to improving the AMDB 104 using a node-edge network of geospatial objects, or a combination thereof.

In a particular implementation, the system memory 1230 includes a non-transitory, computer readable medium (e.g., a computer-readable storage device) storing the instructions 1236 that, when executed by the processor(s) 1220, cause the processor(s) 1220 to initiate, perform, or control operations to improve an airport mapping database using a node-edge network of geospatial objects.

The operations include receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The operations also include determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. The operations also include generating spatial relationship data describing the routing relationship, wherein generating the spatial relationship data comprises generating data describing nodes or edges of a node-edge network. The operations also include adding the spatial relationship data to the geospatial data.

The one or more storage devices 1240 include nonvolatile storage devices, such as magnetic disks, optical disks, or flash memory devices. In a particular example, the storage devices 1240 include both removable and non-removable memory devices. The storage devices 1240 are configured to store an operating system, images of operating systems, applications (e.g., one or more of the applications 1234), and program data (e.g., the program data 1238). In a particular aspect, the system memory 1230, the storage devices 1240, or both, include tangible computer-readable media. In a particular aspect, one or more of the storage devices 1240 are external to the computing device 1210.

The one or more input/output interfaces 1290 enable the computing device 1210 to communicate with one or more input/output devices 1270 to facilitate user interaction. For example, the one or more input/output interfaces 1290 can include a display interface, an input interface, or both. For example, the input/output interface 1290 is adapted to receive input from a user, to receive input from another computing device, or a combination thereof. In some implementations, the input/output interface 1290 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 1270 include one or more user interface devices and displays, including some combination of buttons, keyboards, pointing devices, displays, speakers, microphones, touch screens, and other devices.

The processor(s) 1220 are configured to communicate with devices or controllers 1280 via the one or more communications interfaces 1260. For example, the one or more communications interfaces 1260 can include a network interface. The devices or controllers 1280 can include, for example, the AMDB 104 of FIG. 1. The communications interface(s) 1260 can include the interface(s) 126 of FIG. 1.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-11. In some implementations, part or all of one or more of the operations or methods of FIGS. 1-11 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a method includes receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The method also includes determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. The method also includes generating spatial relationship data describing the routing relationship, wherein generating the spatial relationship data includes generating data describing nodes or edges of a node-edge network. The method also includes adding the spatial relationship data to the geospatial data.

Clause 2 includes the method of Clause 1, wherein the first geospatial object includes a taxi guidance object.

Clause 3 includes the method of Clause 1 or Clause 2, wherein determining the routing relationship includes identifying the first geospatial object as a taxiway intersection and identifying one or more neighbors of the first geospatial object.

Clause 4 includes the method of any of Clauses 1-3, wherein determining the routing relationship includes: generating a logical object from the first geospatial data and the second geospatial data, wherein the first geospatial object includes a first runway object, and the second geospatial object includes a second runway object; and segmenting the logical object to generate one or more topology connectors.

Clause 5 includes the method of any of Clauses 1-4, wherein determining the routing relationship includes: generating a logical object from the first geospatial data and the second geospatial data, wherein the first geospatial object includes a first runway displaced area, and the second geospatial object includes a second runway displaced area; and segmenting the logical object to generate one or more topology connectors.

Clause 6 includes the method of any of Clauses 1-5, wherein the first geospatial object includes a parking stand object.

Clause 7 includes the method of Clause 6, wherein the second geospatial object includes a taxiway object.

Clause 8 includes the method of Clause 7, wherein the first geospatial data describes a first polygon representing boundaries of the first geospatial object and the second geospatial data describes a second polygon representing boundaries of the second geospatial object, and wherein determining the routing relationship includes identifying a topological relationship between the first polygon and the second polygon.

Clause 9 includes the method of Clause 8, wherein the method also includes including identifying a third geospatial object as a nearest neighbor to the first polygon based at least on third geospatial data representative of the third geospatial object, wherein the routing relationship is based at least on the first geospatial data, the second geospatial data, and the third geospatial data.

Clause 10 includes the method of any of Clauses 1-9, wherein determining the routing relationship between the first geospatial object and the second geospatial object includes determining a plurality of topology connectors.

Clause 11 includes the method of any of Clauses 1-10, wherein determining the routing relationship between the first geospatial object and the second geospatial object includes identifying a geospatial object of the plurality of geospatial objects as a topology node.

Clause 12 includes the method of any of Clauses 1-11, wherein the first geospatial object includes a deicing location.

Clause 13 includes the method of any of Clauses 1-13, wherein the first geospatial object includes a portion of a runway.

Clause 14 includes the method of any of Clauses 1-13, wherein the first geospatial object includes a stopway.

Clause 15 includes the method of any of Clauses 1-14, wherein the first geospatial object includes a portion of a runway displaced area.

Clause 16 includes the method of any of Clauses 1-15, wherein the first geospatial object includes a taxi holding area.

According to Clause 17, a non-transient, computer-readable medium storing instructions executable by one or more processors to perform operations that include receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The operation also includes determining a routing relationship between the first geospatial object and the second geospatial object based at least on the first geospatial data and the second geospatial data, wherein the routing relationship indicates that an aircraft using the airport taxi system can pass from the first geospatial object to the second geospatial object. The operations also include generating spatial relationship data describing the routing relationship, wherein generating the spatial relationship data includes generating data describing nodes or edges of a node-edge network. The operations also include adding the spatial relationship data to the geospatial data.

Clause 18 includes the non-transient, computer-readable medium of Clause 17, wherein the first geospatial object includes a taxi guidance object.

Clause 19 includes the non-transient, computer-readable medium of Clause 17 or Clause 18, wherein determining the routing relationship includes identifying the first geospatial object as a taxiway intersection and identifying one or more neighbors of the first geospatial object.

Clause 20 includes the non-transient, computer-readable medium of any of Clauses 17-19, wherein determining the routing relationship includes: generating a logical object from the first geospatial data and the second geospatial data, wherein the first geospatial object includes a first runway object and the second geospatial object includes a second runway object; and segmenting the logical object to generate one or more topology connectors.

Clause 21 includes the non-transient, computer-readable medium of any of Clauses 17-20, wherein determining the routing relationship includes: generating a logical object from the first geospatial data and the second geospatial data, wherein the first geospatial object includes a first runway displaced area and the second geospatial object includes a second runway displaced area; and segmenting the logical object to generate one or more topology connectors.

Clause 22 includes the non-transient, computer-readable medium of any of Clauses 17-21, wherein the first geospatial object includes a parking stand object.

Clause 23 includes the non-transient, computer-readable medium of Clause 22, wherein the second geospatial object includes a taxiway object.

Clause 24 includes the non-transient, computer-readable medium of Clause 23, wherein the first geospatial data describes a first polygon representing boundaries of the first geospatial object and the second geospatial data describes a second polygon representing boundaries of the second geospatial object, and wherein determining the routing relationship includes identifying a topological relationship between the first polygon and the second polygon.

Clause 25 includes the non-transient, computer-readable medium of Clause 24, further including identifying a third geospatial object as a nearest neighbor to the first polygon based at least on third geospatial data representative of the third geospatial object, wherein the routing relationship is based at least on the first geospatial data, the second geospatial data, and the third geospatial data.

Clause 26 includes the non-transient, computer-readable medium of any of Clauses 17-25, wherein determining the routing relationship between the first geospatial object and the second geospatial object includes determining a plurality of topology connectors.

Clause 27 includes the non-transient, computer-readable medium of any of Clauses 17-26, wherein determining the routing relationship between the first geospatial object and the second geospatial object includes identifying a geospatial object of the plurality of geospatial objects as a topology node.

Clause 28 includes the non-transient, computer-readable medium of any of Clauses 17-27, wherein the first geospatial object includes a deicing location.

Clause 29 includes the non-transient, computer-readable medium of any of Clauses 17-28, wherein the first geospatial object includes a portion of a runway.

Clause 30 includes the non-transient, computer-readable medium of any of Clauses 17-29, wherein the first geospatial object includes a stopway.

Clause 31 includes the non-transient, computer-readable medium of any of Clauses 17-30, wherein the first geospatial object includes a portion of a runway displaced area.

Clause 32 includes the non-transient, computer-readable medium of any of Clauses 17-31, wherein the first geospatial object includes a taxi holding area.

According to Clause 33, a system includes a memory and one or more processors configured to receive, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object. The one or more processors are also configured to determine a routing relationship between the first geospatial object and the second geospatial object based at least on the first geospatial data and the second geospatial data, wherein the routing relationship indicates that an aircraft using the airport taxi system can pass from the first geospatial object to the second geospatial object. The one or more processors are also configured to generate spatial relationship data describing the routing relationship, wherein generating the spatial relationship data includes generating data describing nodes or edges of a node-edge network. The one or more processors are also configured to add the spatial relationship data to the geospatial data.

Clause 34 includes the system of Clause 33, wherein the first geospatial object includes a taxi guidance object.

Clause 35 includes the system of Clause 33 or Clause 34, wherein the one or more processors are configured to determine the routing relationship by identifying the first geospatial object as a taxiway intersection and identifying one or more neighbors of the first geospatial object.

Clause 36 includes the system of any of Clauses 33-35, wherein the one or more processors are configured to determine the routing relationship by: generating a logical object from the first geospatial data and the second geospatial data, wherein the first geospatial object includes a first runway object and the second geospatial object includes a second runway object; and segmenting the logical object to generate one or more topology connectors.

Clause 37 includes the system of any of Clauses 33-36, wherein the one or more processors are configured to determine the routing relationship by: generating a logical object from the first geospatial data and the second geospatial data, wherein the first geospatial object includes a first runway displaced area and the second geospatial object includes a second runway displaced area; and segmenting the logical object to generate one or more topology connectors.

Clause 38 includes the system of any of Clauses 33-37, wherein the first geospatial object includes a parking stand object.

Clause 39 includes the system of Clause 38, wherein the second geospatial object includes a taxiway object.

Clause 40 includes the system of Clause 39, wherein the first geospatial data describes a first polygon representing boundaries of the first geospatial object and the second geospatial data describes a second polygon representing boundaries of the second geospatial object, and wherein the one or more processors are configured to determine the routing relationship by identifying a topological relationship between the first polygon and the second polygon.

Clause 41 includes the system of Clause 40, the one or more processors are further configured to identify a third geospatial object as a nearest neighbor to the first polygon based at least on third geospatial data representative of the third geospatial object, wherein the routing relationship is based at least on the first geospatial data, the second geospatial data, and the third geospatial data.

Clause 42 includes the system of any of Clauses 33-41, wherein the one or more processors are configured to determine the routing relationship between the first geospatial object and the second geospatial object by determining a plurality of topology connectors.

Clause 43 includes the system of any of Clauses 33-42, wherein the one or more processors are configured to determine the routing relationship between the first geospatial object and the second geospatial object by identifying a geospatial object of the plurality of geospatial objects as a topology node.

Clause 44 includes the system of any of Clauses 33-43, wherein the first geospatial object includes a deicing location.

Clause 45 includes the system of any of Clauses 33-44, wherein the first geospatial object includes a portion of a runway.

Clause 46 includes the system of any of Clauses 33-45, wherein the first geospatial object includes a stopway.

Clause 47 includes the system of any of Clauses 33-46, wherein the first geospatial object includes a portion of a runway displaced area.

Clause 48 includes the system of any of Clauses 33-47, wherein the first geospatial object includes a taxi holding area.

What is claimed is:
1. A method comprising:
receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object;

determining a routing relationship between the first geospatial object and the second geospatial object based at least on the first geospatial data and the second geospatial data, wherein the routing relationship indicates that an aircraft using the airport taxi system can pass from the first geospatial object to the second geospatial object;

generating spatial relationship data describing the routing relationship, wherein generating the spatial relationship data comprises generating data describing nodes or edges of a node-edge network;

adding the spatial relationship data to the geospatial data to generate updated geospatial data; and storing the updated geospatial data at the AMDB.

2. The method of claim 1, wherein the first geospatial object comprises a taxi guidance object.

3. The method of claim 1, wherein determining the routing relationship comprises identifying the first geospatial object as a taxiway intersection and identifying one or more neighbors of the first geo spatial object.

4. The method of claim 1, wherein determining the routing relationship comprises:

generating a logical object from the first geospatial data and the second geospatial data, wherein the first geospatial object comprises a first runway object and the second geospatial object comprises a second runway object; and segmenting the logical object to generate one or more topology connectors.

5. The method of claim 1, wherein determining the routing relationship comprises:

generating a logical object from the first geospatial data and the second geospatial data, wherein the first geospatial object comprises a first runway displaced area and the second geospatial object comprises a second runway displaced area; and segmenting the logical object to generate one or more topology connectors.

6. The method of claim 1, wherein the first geospatial object comprises a parking stand object.

7. The method of claim 6, wherein the second geospatial object comprises a taxiway object.

8. The method of claim 7, wherein the first geospatial data describes a first polygon representing boundaries of the first geospatial object and the second geospatial data describes a second polygon representing boundaries of the second geospatial object, and wherein determining the routing relationship comprises identifying a topological relationship between the first polygon and the second polygon.

9. The method of claim 1, wherein determining the routing relationship between the first geospatial object and the second geospatial object comprises determining a plurality of topology connectors.

10. The method of claim 1, wherein determining the routing relationship between the first geospatial object and the second geospatial object comprises identifying a geospatial object of the plurality of geospatial objects as a topology node.

11. The method of claim 1, wherein the first geospatial object comprises a deicing location.

12. The method of claim 1, wherein the first geospatial object comprises a portion of a runway.

13. The method of claim 1, wherein the first geospatial object comprises a stopway.

14. The method of claim 1, wherein the first geospatial object comprises a portion of a runway displaced area.

15. The method of claim 1, wherein the first geospatial object comprises a taxi holding area.

16. A non-transient, computer-readable medium storing instructions executable by one or more processors to perform operations that include:

receiving, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object;

determining a routing relationship between the first geospatial object and the second geospatial object based at least on the first geospatial data and the second geospatial data, wherein the routing relationship indicates that an aircraft using the airport taxi system can pass from the first geospatial object to the second geospatial object;

generating spatial relationship data describing the routing relationship, wherein generating the spatial relationship data comprises generating data describing nodes or edges of a node-edge network;

adding the spatial relationship data to the geospatial data to generate updated geospatial data; and storing the updated geospatial data at the AMDB.

17. The non-transient, computer-readable medium of claim 16, wherein determining the routing relationship comprises identifying the first geospatial object as a taxiway intersection and identifying one or more neighbors of the first geospatial object.

18. The non-transient, computer-readable medium of claim 16, wherein:

the first geospatial object comprises a parking stand object;

the second geospatial object comprises a taxiway object;

the first geospatial data describes a first polygon representing boundaries of the first geospatial object and the second geospatial data describes a second polygon representing boundaries of the second geospatial object; and determining the routing relationship comprises identifying a topological relationship between the first polygon and the second polygon.

19. A system comprising:

a memory;

one or more processors configured to:

receive, from an airport mapping database ("AMDB"), geospatial data representative of a plurality of geospatial objects of an airport taxi system, the plurality of geospatial objects including a first geospatial object and a second geospatial object, wherein first geospatial data is representative of the first geospatial object and second geospatial data is representative of the second geospatial object;

determine a routing relationship between the first geospatial object and the second geospatial object based at least on the first geospatial data and the second geospatial data, wherein the routing relationship indicates that an aircraft using the airport taxi system can pass from the first geospatial object to the second geospatial object;

generate spatial relationship data describing the routing relationship, wherein generating the spatial relationship data comprises generating data describing nodes or edges of a node-edge network;
add the spatial relationship data to the geospatial data to generate updated geospatial data; and
store the updated geospatial data at the AMDB.

20. The system of claim 19, wherein:
the first geospatial object comprises a parking stand object;
the second geospatial object comprises a taxiway object;
the first geospatial data describes a first polygon representing boundaries of the first geospatial object and the second geospatial data describes a second polygon representing boundaries of the second geospatial object; and
the one or more processors are configured to determine the routing relationship comprises by identifying a topological relationship between the first polygon and the second polygon.

* * * * *